(12) United States Patent
Sasade et al.

(10) Patent No.: US 10,591,049 B2
(45) Date of Patent: Mar. 17, 2020

(54) VEHICLE CONTROL APPARATUS

(71) Applicant: TOYOTA JIDOSHA KABUSHIKI KAISHA, Toyota-shi, Aichi (JP)

(72) Inventors: Shinichi Sasade, Toyota (JP); Kazuyuki Shiiba, Toyota (JP); Tooru Matsubara, Miyoshi (JP); Koji Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/051,740

(22) Filed: Aug. 1, 2018

(65) Prior Publication Data

US 2019/0048995 A1    Feb. 14, 2019

(30) Foreign Application Priority Data

Aug. 9, 2017 (JP) .................. 2017-154699

(51) Int. Cl.

| F16H 59/14 | (2006.01) |
|---|---|
| F16H 3/72 | (2006.01) |
| F16H 37/08 | (2006.01) |
| B60K 6/547 | (2007.10) |
| B60K 6/445 | (2007.10) |

(Continued)

(52) U.S. Cl.
CPC ............ *F16H 59/14* (2013.01); *B60K 6/365* (2013.01); *B60K 6/445* (2013.01); *B60K 6/547* (2013.01); *F16H 3/66* (2013.01); *F16H 3/728* (2013.01); *F16H 37/0833* (2013.01); *F16H 61/04* (2013.01); *F16H 61/06* (2013.01); *F16H 61/686* (2013.01); *B60Y 2200/92* (2013.01); *F16H 59/44* (2013.01); *F16H 59/72* (2013.01); *F16H 2061/044* (2013.01); *F16H 2061/062* (2013.01); *F16H 2200/0069* (2013.01); *F16H 2200/201* (2013.01); *F16H 2200/2041* (2013.01);

(Continued)

(58) Field of Classification Search
CPC ..... F16H 59/14; F16H 61/04; F16H 2061/044
See application file for complete search history.

(56) References Cited

U.S. PATENT DOCUMENTS

| 5,842,949 A * | 12/1998 | Kuriyama | ............. F16H 61/143 477/63 |
|---|---|---|---|
| 10,167,947 B2 * | 1/2019 | Chimbe | ............. F16H 61/0213 |

(Continued)

FOREIGN PATENT DOCUMENTS

JP    2006-009942 A    1/2006

*Primary Examiner* — David R Morris
(74) *Attorney, Agent, or Firm* — Oliff PLC

(57) ABSTRACT

A control apparatus for a vehicle provided with a step-variable transmission including a one-way clutch to be placed in an engaged state to establish a predetermined one of gear positions of the step-variable transmission, and a coupling device disposed parallel with the one-way clutch, includes a control portion configured to control a shift-up action of the step-variable transmission from the above-indicated predetermined one gear position in which the coupling device is placed in its engaged state, the control portion controlling the shift-up action so as to delay a releasing action of the coupling device where a required torque of the vehicle prior to a moment of initiation of an inertia phase of the shift-up action is larger than a predetermined value, with respect to the releasing action where the required torque is not larger than the predetermined value.

6 Claims, 10 Drawing Sheets

(51) Int. Cl.
    *B60K 6/365*       (2007.10)
    *F16H 61/04*       (2006.01)
    *F16H 61/06*       (2006.01)
    *F16H 61/686*     (2006.01)
    *F16H 3/66*         (2006.01)
    *F16H 59/72*       (2006.01)
    *F16H 59/44*       (2006.01)

(52) U.S. Cl.
    CPC ............... *F16H 2200/2066* (2013.01); *F16H 2200/2082* (2013.01)

(56) References Cited

U.S. PATENT DOCUMENTS

| | | | |
|---|---|---|---|
| 10,343,508 B2* | 7/2019 | Sugiyama | B60W 20/30 |
| 10,369,983 B2* | 8/2019 | Katsumata | B60W 20/00 |
| 10,407,075 B2* | 9/2019 | Tatsushiro | B60W 10/06 |
| 2018/0023694 A1* | 1/2018 | Chimbe | F16H 61/0213 701/66 |
| 2018/0170166 A1* | 6/2018 | Sugiyama | B60K 6/547 |
| 2018/0170345 A1* | 6/2018 | Katsumata | B60W 20/10 |
| 2018/0170346 A1* | 6/2018 | Katsumata | B60W 20/00 |
| 2018/0170390 A1* | 6/2018 | Tatsushiro | B60W 20/15 |
| 2018/0178774 A1* | 6/2018 | Katsumata | B60W 10/105 |
| 2018/0354495 A1* | 12/2018 | Kumazaki | B60W 20/30 |
| 2019/0032774 A1* | 1/2019 | Yoshikawa | F16H 61/0437 |
| 2019/0061734 A1* | 2/2019 | Sugiyama | B60W 10/06 |
| 2019/0061737 A1* | 2/2019 | Goto | B60W 10/115 |
| 2019/0061738 A1* | 2/2019 | Goto | B60W 20/30 |
| 2019/0063603 A1* | 2/2019 | Hiasa | F16H 37/0826 |

* cited by examiner

| AT GEAR POSITION | C1 | C2 | B1 | B2 | OWC |
|---|---|---|---|---|---|
| 1st | ○ | | | ○ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-154699 filed on Aug. 9, 2017, the disclosure of which is herein incorporated by reference in its entirety.

FIELD OF THE INVENTION

The present invention relates to a control apparatus for a vehicle provided with a step-variable transmission which is disposed between a drive power source and drive wheels and which includes a one-way clutch.

BACKGROUND OF THE INVENTION

There is well known a vehicle provided with a step-variable transmission disposed between a drive power source and drive wheels. JP-2006-9942A discloses an example of this type of vehicle. This vehicle is a hybrid vehicle provided with an engine, planetary gear sets functioning as a differential mechanism, and first and second electric motors operatively connected to rotary elements of the planetary gear sets in a power transmittable manner. JP-2006-9942A also discloses a technique for calculating output torques of the first and second electric motors on the basis of their electric current values, estimating an input torque of the step-variable transmission on the basis of the calculated output torques of the first and second electric motors, and controlling transient hydraulic pressures to be applied to coupling devices of the step-variable transmission to implement its shifting actions, on the basis of the estimated input torque.

By the way, the known step-variable transmission may include a one-way clutch, which is placed in its engaged state to establish a predetermined one (first speed gear position, for example) of gear positions of the step-variable transmission. In the hybrid vehicle as disclosed in JP-2006-9942A, a regenerative control of an electric motor is implemented when a reverse or negative drive torque is transmitted in a direction from the drive wheels toward the step-variable transmission during running of the hybrid vehicle while the step-variable transmission is placed in the above-indicated predetermined gear position. When the negative drive torque is transmitted to the step-variable transmission, the one-way clutch is brought into its released state, and the predetermined gear position of the step-variable transmission is not established, so that it is difficult to implement the regenerative control of the electric motor. To prevent this difficulty, the step-variable transmission is provided with a coupling device disposed parallel to the one-way clutch. The coupling device is placed in an engaged state during running of the vehicle with the step-variable transmission being placed in the predetermined gear position, so that the step-variable transmission is held in the predetermined gear position even when the negative drive torque is transmitted to the step-variable transmission, whereby the regenerative control of the electric motor can be implemented.

When the step-variable transmission is shifted up from the predetermined gear position to another gear position, the coupling device disposed parallel with the one-way clutch is brought into its released state. In the event of generation of fluctuation such as resonance in the step-variable transmission during this shift-up action of the step-variable transmission, an excessively large torque acts on the one-way clutch, giving rise to a risk of reduction of durability of the one-way clutch. If a releasing action of the coupling device is delayed to prevent this risk, an engaging hydraulic pressure of the coupling device becomes excessively high with respect to an input torque of the step-variable transmission which is rapidly reduced as a result of a releasing action of an accelerator pedal in the process of the shift-up action. In this event, the step-variable transmission is placed in a tie-up state, giving rise to a risk of generation of a shifting shock upon initiation of an inertia phase of the shift-up action.

SUMMARY OF THE INVENTION

The present invention was made in view of the background art described above. It is therefore an object of the present invention to provide a control apparatus for a vehicle provided with a step-variable transmission disposed between a drive power source and drive wheels and including a one-way clutch, which control apparatus permits reduction of a risk of reduction of durability of the one-way clutch and a risk of generation of a shifting shock of the step-variable transmission in the process of a shift-up action of the step-variable transmission.

The object indicated above is achieved according to the following modes of the present invention:

According to a first mode of the invention, there is provided a control apparatus for a vehicle provided with a step-variable transmission which is disposed between a drive power source and drive wheels and which includes a one-way clutch to be placed in an engaged state to establish a predetermined one of gear positions of the step-variable transmission, and a coupling device disposed parallel with the one-way clutch, the control apparatus comprising a control portion configured to control a shift-up action of the step-variable transmission from the above-described predetermined one gear position in which the coupling device is placed in its engaged state, the control portion controlling the shift-up action so as to delay a releasing action of the coupling device where a required torque of the vehicle prior to a moment of initiation of an inertia phase of the shift-up action is larger than a predetermined value, with respect to the releasing action where the required torque is not larger than the predetermined value.

According to a second mode of the invention, the control apparatus according to the first mode of the invention is configured such that the control portion temporarily keeps a commanded value of a releasing hydraulic pressure of the coupling device at a predetermined hold-pressure value larger than zero, to thereby delay the releasing action of the coupling device.

According to a third mode of the invention, the control apparatus according to the second mode of the invention is configured such that the control portion changes the predetermined hold-pressure value according to a temperature of a working fluid used to operate the coupling device.

According a fourth mode of the invention, the control apparatus according to the second mode of the invention is configured such that the control portion changes the predetermined hold-pressure value according to a running speed of the vehicle.

According to a fifth mode of the invention, the control apparatus according to the first mode of the invention is configured such that the control portion is configured to continuously determine whether the required torque of the vehicle is larger than the predetermined value, during a time period from a moment of initiation of the shift-up action of the step-variable transmission to the moment of initiation of the inertia phase of the shift-up action.

According to a sixth mode of the invention, the drive power source includes: an engine; a differential mechanism having a first rotary element operatively connected to the engine in a power transmittable manner, a second rotary element to which a first motor/generator is operatively connected in a power transmittable manner, and a third rotary element to which an input shaft of the step-variable transmission is connected; and a second motor/generator operatively connected to the third rotary element of the differential mechanism in a power transmittable manner.

The control apparatus according to the first mode of the invention is configured to delay the releasing action of the coupling device where the required torque of the vehicle prior to the moment of initiation of the inertia phase of the shift-up action of the step-variable transmission is larger than the predetermined value, with respect to the releasing action where the required torque is not larger than the predetermined value. Accordingly, a load acting on the one-way clutch is reduced even in the event of generation of resonance in the step-variable transmission, so that the risk of reduction of durability of the one-way clutch is reduced. Further, a relatively small load acts on the one-way clutch where the required torque is not larger than the predetermined value, so that the coupling device is more quickly brought into its released state than where the required torque is larger than the predetermined value. Accordingly, where the required torque has been reduced to or below the predetermined value as a result of a releasing operation of an accelerator pedal prior to the moment of initiation of the inertia phase of the shift-up action of the step-variable transmission, for instance, the coupling device is quickly brought into its released state, so that the step-variable transmission is prevented from being placed in a tie-up state, while at the same time the risk of generation of the shifting shock of the step-variable transmission upon initiation of the inertia phase is reduced. Thus, the control apparatus according to the present invention permits reduction of the risk of generation of the shifting shock in the process of the shift-up action while permitting reduction of the risk of reduction of durability of the one-way clutch.

According to the second mode of the invention, the control portion temporarily keeps the commanded value of the releasing hydraulic pressure of the coupling device at the predetermined hold-pressure value larger than zero, to thereby delay the releasing action of the coupling device. Accordingly, the control apparatus according to the second mode of the invention permits not only the reduction of the risk of reduction of durability of the one-way clutch, but also a quick releasing action of the coupling device, making it possible to prevent the tie-up state of the step-variable transmission when releasing the coupling device.

According to the third mode of the invention, the predetermined hold-pressure value at which the releasing hydraulic pressure of the coupling device is temporarily kept to delay the releasing action of the coupling device is changed by the control portion according to the temperature of the working fluid used to operate the coupling device. Accordingly, the control apparatus according to the third mode of the invention permits not only the reduction of the risk of reduction of durability of the one-way clutch irrespective of the temperature of the working fluid, but also the quick releasing action of the coupling device when the required torque has been reduced to or below the predetermined value.

According to the fourth mode of the invention, the predetermined hold-pressure value at which the releasing hydraulic pressure of the coupling device is temporarily kept to delay the releasing action of the coupling device is changed according to the running speed of the vehicle. Accordingly, the control apparatus according to the fourth mode of the invention permits not only the reduction of the risk of reduction of durability of the one-way clutch irrespective of the running speed of the vehicle, but also the quick releasing action of the coupling device when the required torque has been reduced to or below the predetermined value.

According to the fifth mode of the invention, the required torque determining portion continuously determines whether the required torque of the vehicle is larger than the predetermined value, during the time period from the moment of initiation of the shift-up action of the step-variable transmission to the moment of initiation of the inertia phase of the shift-up action. Accordingly, the control apparatus according to the fifth mode of the invention permits the quick releasing action of the coupling device when the required torque has been reduced to or below the predetermined value during the shift-up action, making it possible to prevent the tie-up state of the step-variable transmission.

According to the sixth mode of the invention, an input torque transmitted to the step-variable transmission can be calculated on the basis of outputs of the engine, the first motor/generator and the second motor/generator.

DETAILED DESCRIPTION OF INVENTION

Figure 1:
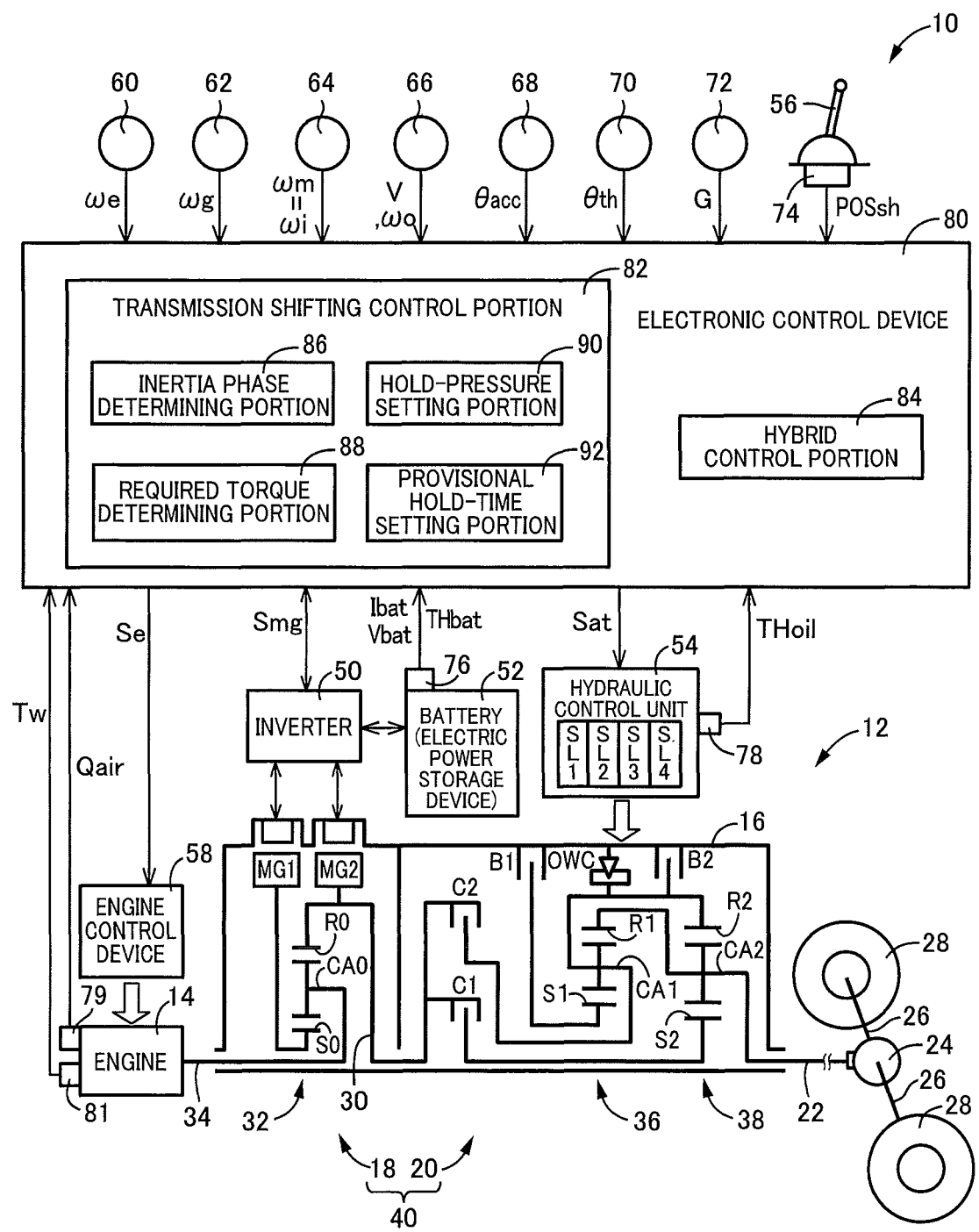
FIG. 1 is a schematic view showing an arrangement of one example of a vehicular drive system to be controlled by a control apparatus according to one embodiment of the present invention, and major control functions and control portions of the control apparatus.

The "releasing action" of each coupling device described herein is interpreted to mean lowering of a commanded value of a releasing hydraulic pressure of the coupling device to zero or a substantially zero value. In this respect, it is noted that "delaying" of the releasing action of the coupling device is interpreted to mean temporary holding of the commanded value of the releasing hydraulic pressure at a predetermined hold-pressure value higher than the zero or substantially zero value.

Referring to the drawings, preferred embodiments of the present invention will be described in detail. It is to be understood that the drawings are simplified and transformed as needed, and do not necessarily accurately represent dimensions and shapes of various elements of the embodiments.

First Embodiment

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission 18 (hereinafter referred to as "continuously variable transmission 18") connected directly or indirectly via a damper (not shown) or any other device to the engine 14, and a mechanically operated step-variable transmission 20 (hereinafter referred to as "step-variable transmission 20") connected to an output rotary member of the continuously variable transmission 18. The continuously variable transmission 18 and the step-variable transmission 20 are disposed in series with each other within a transmission casing 16 (hereinafter referred to as "casing 16") functioning as a non-rotatable member fixed to a vehicle body, such that the transmissions 18 and 20 are disposed coaxially with each other on a common axis. The vehicular drive system 12 is further provided With a differential gear mechanism 24 connected to an output rotary member of the step-variable transmission 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission 20, and is transmitted from the step-variable transmission 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission 18 and the step-variable transmission 20 are constructed substantially symmetrically with each other about the axis of the engine 14 (about the above-indicated common axis), and that FIG. 1 does not show the lower halves of the transmissions 18 and 20.

The engine 14 is the drive power source to drive the vehicle 10, which is a known internal combustion engine such as a gasoline engine or a diesel engine. An engine torque Te, which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously variable transmission 18, without a fluid-operated type power transmitting device such as a torque converter or a fluid coupling being disposed between the engine 14 and the transmission 18.

The continuously variable transmission 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission 18; and the second motor/generator MG2 operatively connected to the intermediate power transmitting member 30. The continuously variable transmission 18 is an electrically controlled continuously variable, transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator.

In the continuously variable transmission 18, a drive force generated by the engine 14 is distributed to the first motor/generator MG1 and the intermediate power transmitting member 30. Further, a part or an entirety of an electric power generated by the first motor/generator MG1 is supplied to the second motor/generator MG2. The second motor/generator MG2 is operated with at least one of an electric power supplied from the first motor/generator MG1 and an electric power supplied from a battery 52, and a drive force generated by the second motor/generator MG2 is transmitted to the intermediate power transmitting member 30. The drive force transmitted to the intermediate power transmitting member 30 is received by the step-variable transmission 20. Thus, the vehicle 10 is a hybrid vehicle provided with the drive power source in the form of the engine 14 and the second motor/generator MG2. In the present embodiment, the engine 14, and the continuously variable transmission 18 cooperate to function as the drive power source.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is respectively supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission 20 is a mechanically operated transmission mechanism which constitutes a part of a power transmitting path between the intermediate power transmitting member 30 and the drive wheels 28. The intermediate power transmitting member 30 also functions as an input rotary member of the step-variable transmission 20. The step-variable transmission 20 is a known automatic transmission of a planetary gear type which is provided with a plurality of planetary gear sets in the form of a first planetary gear set 36 and a second planetary gear set 38, a plurality of coupling devices in the form of a clutch C1, a clutch C2, a brake B1 and a brake B2 (hereinafter referred to as "coupling devices CB" unless otherwise specified), and a one-way clutch OWC. The step-variable transmission 20 is shifted with engaging and releasing actions of the coupling devices CB and the one-way clutch OWC. The one-way clutch OWC is of a well known sprag type or roller type, which permits transmission of a rotary motion in one of opposite directions and prevents transmission of a rotary motion in the other direction.

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipping or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque (CB-transmitted torque) Tcb and the engaging hydraulic pressure PRcb are proportional to each other, after the engaging hydraulic pressure PRcb has been raised to initiate an engaging contact of the input and output elements with each other.

In the step-variable transmission 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or the one-way clutch OWC.

The step-variable transmission 20 is a step-variable automatic transmission which is shifted to a selected one of four gear positions (speed positions) by engaging actions of selected ones of the coupling devices CB. These four gear positions have respective different speed ratios γat (=input shaft speed ωi/output shaft speed ωo). Namely, the step-variable transmission 20 is a step-variable automatic transmission which is shifted up and down from one gear position to another by placing selected ones of the coupling devices CB in the engaged state. In the present embodiment, the gear positions of the step-variable transmission 20 are referred to as "AT gear positions". The input shaft speed ωi is a rotating speed (angular velocity) of the input shaft of the step-variable transmission. 20, that is, a rotating speed of the intermediate power transmitting member 30, which is equal to an MG2 speed ωm which is an operating speed of the second motor/generator MG2, which is operatively connected to the step-variable transmission 20 in a power transmittable manner. Namely, the input shaft speed of ωi can be represented by the MG2 speed ωm. The output shaft speed ωo is a rotating speed of the output shaft 22 of the step-variable transmission 20, which is considered to be an output shaft speed of a transmission device 40 which consists of the continuously variable transmission 18 and the step-variable transmission 20.

Figures 2, 3:
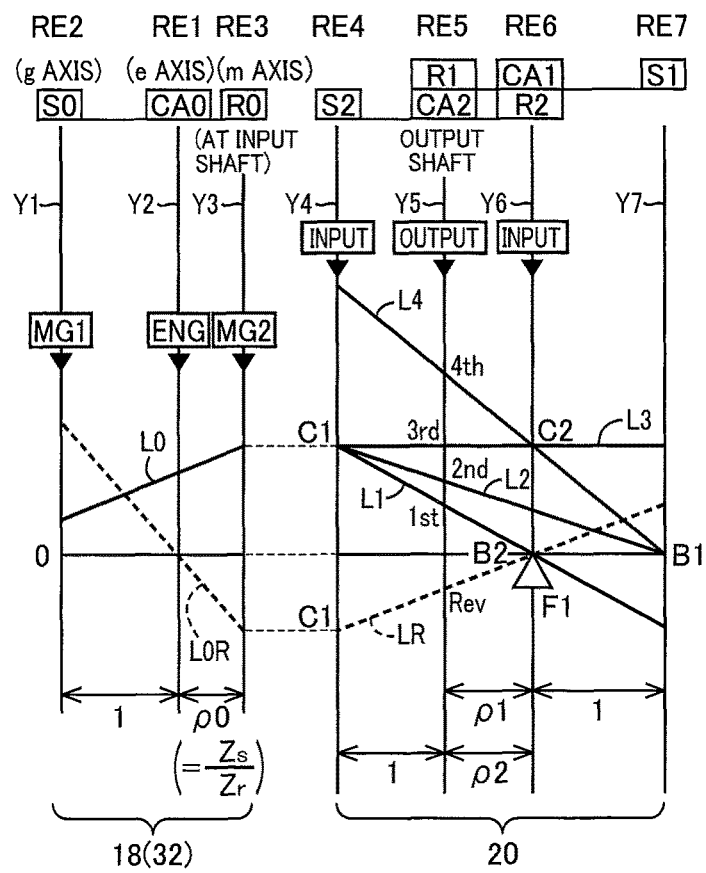
FIG. 2 is a table indicating a relationship between AT gear positions of a mechanically operated step-variable transmission shown in FIG. 1 and combinations of coupling devices placed in engaged states to establish the respective gear positions.
FIG. 3 is a collinear chart indicating a relationship among rotating speeds of rotary elements of an electrically controlled continuously variable transmission and the mechanically operated step-variable transmission.

Reference is now made to FIG. 2, which is the table indicating the relationship between the first through fourth speed AT gear positions of the step-variable transmission 20 shown in FIG. 1 and combinations of the coupling devices CB placed in the engaged states to establish the respective AT gear positions. In the table, the four forward drive AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed. AT gear position (lowest-speed gear position) "$1^{st}$" toward the fourth speed AT gear position (highest-speed gear position) "$4^{th}$". In the table, "O" indicates the engaged state of the coupling devices CB, and the blank indicates the released state of the coupling devices CB. The one-way clutch OWC indicated above is disposed parallel to the brake B2 which is placed in the engaged state to establish the first speed AT gear position "$1^{st}$", so that the brake B2 is not required to be placed in the engaged state upon starting of the vehicle 10. It is noted that the step-variable transmission 20 is placed in a neutral position (a power transmission cutoff state) when all of the coupling devices CB are placed in the released states.

The step-variable transmission 20 is shifted up or down to establish a newly selected one of the four AT gear positions, according to an operation amount θacc of an accelerator pedal by a driver (operator) of the vehicle 10 and a vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission 20. The above-indicated one coupling device CB was placed in the engaged state before the step-variable transmission 20 is shifted to establish the newly selected. AT gear position, while the above-indicated another coupling device CB is placed in the engaged state while the step-variable transmission 20 is placed in the newly selected AT gear position. Thus, the step-variable transmission 20 is shifted up or down from one of the AT gear positions to another by so-called "clutch-to-clutch" shifting operation, namely, concurrent releasing and engaging actions of the selected two coupling devices CB. For instance, the step-variable transmission 20 is shifted up from the first speed AT gear position "1$^{st}$" to the second speed AT gear position "2$^{nd}$", with the releasing action of the releasing-side coupling device CB in the form of the brake B2 and the concurrent engaging action of the engaging-side coupling device CB in the form of the brake B1, as indicated in the table of FIG. 2. In this instance, the engaging hydraulic pressure applied to the brake B1 and the releasing hydraulic pressure applied to the brake B2 are transiently controlled to bring these brakes B1 and B2 into the engaged and released states, respectively.

The collinear chart of FIG. 3 indicates a relationship among rotating speeds of the rotary elements of the continuously variable transmission 18 and the step-variable transmission 20. In this collinear chart, three vertical lines Y1, Y2 and Y3 corresponding to the respective three rotary elements of the differential mechanism 32 of the continuously variable transmission 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input shaft rotating speed of the step-variable transmission 20). Further, four vertical lines Y4, Y5, Y6 and Y7 corresponding to the respective four rotary elements of the step-variable transmission 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/ number of teeth Zr of the ring gear).

Referring to the collinear chart of FIG. 3, the differential mechanism 32 of the continuously variable transmission 18 is arranged such that the engine 14 (represented as "ENG" in the collinear chart) is operatively connected to the first rotary element RE1 in a power transmittable manner, and the first motor/generator MG1 (represented as "MG1" in the collinear chart) is operatively connected to the second rotary element RE2 in a power transmittable manner, while the second motor/generator MG2 (represented as "MG2" in the collinear chart) is operatively connected in a power transmittable manner to the third rotary element RE3 which is rotated together with the intermediate power transmitting member 30. Thus, a rotary motion of the engine 14 is transmitted to the step-variable transmission 20 through the intermediate power transmitting member 30. In a part of the collinear chart corresponding to the continuously variable transmission 18, straight lines L0 and L0R intersecting the vertical line Y2 represent a relationship between the rotating speeds of the sun gear S0 and the ring gear R0.

The step-variable transmission 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission 20, straight lines L1, L2, L3, L4 and LR intersecting the vertical line Y5 represent the rotating speeds of the output shaft 22 in the respective first, second, third, fourth speed AT gear positions "1$^{st}$", "2$^{nd}$", "3$^{rd}$", "4$^{th}$" and reverse drive gear position "Rev" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td (=Te/(1+ρ) =-(1/ρ)*Tg) which is a positive torque is applied to the ring gear R0 and rotating the ring gear R0 in the positive direction. The vehicle 10 is driven in the forward direction with a vehicle drive torque (transmission input torque Ti) which is a sum of the directly transmitted engine torque Td and the MG2 torque Tm and which is transmitted to the drive wheels 28 through the step-variable transmission 20 selectively placed in one of the first through fourth speed AT gear positions according to required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tin which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in a non-operated state, so that an operating speed we of the engine 14 (engine speed we) is kept zero, and the vehicle 10 is driven in the forward direction with the MG2 torque Tm (positive forward driving torque), which is transmitted as a forward drive torque to the drive wheels 28 through the step-variable transmission 20 placed in one of the first through fourth speed AT gear positions.

Broken straight lines TAR and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission 20 placed in the first speed AT gear position. To drive the vehicle 10 in the rearward direction, the electronic control device 80 described below is configured to command the second motor/generator MG2 to generate the reverse driving MG2 torque Tin (negative driving torque) opposite to the forward driving MG2 torque Tm (positive driving torque), while the step-variable transmission 20 is placed in a low-speed AT gear position (first speed AT gear position, for example). Thus, the vehicle 10 is driven in the rearward direction with the reverse (negative) MG2 torque Tm while the step-variable transmission 20 is placed in one of the forward drive AT gear positions. In the hybrid drive mode, too, the second motor/generator MG2 can be operated in the negative direction as indicated by the straight line L0R, so that the vehicle 10 can be driven in the rearward direction in the hybrid drive mode, as well as in the motor drive mode.

In the vehicular drive system 12, the continuously variable transmission 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, the second motor/generator MG2) is operatively connected. Namely, the continuously variable transmission 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission 18 is operated as an electrically controlled continuously variable transmission a speed ratio γ0 (=ωe/ωm) of which is variable. The speed ratio γ0 is a ratio of a rotating speed of the connecting shaft 34 (namely, engine speed ωe) to the rotating speed of the intermediate power transmitting member 30 (namely, MG2 speed ωm).

In the hybrid drive mode, for instance, the rotating speed of the sun gear S0 is raised or lowered by controlling an operating speed of the first motor/generator MG1 while the rotating speed of the ring gear R0 is determined by the rotating speed of the drive wheels 28 with the step-variable transmission 20 placed in one of the AT gear positions, so that the rotating speed of the carrier CA0 (namely, engine speed we) is accordingly raised or lowered. In running with operation of the engine 14, therefore, the engine 14 can be operated at an efficient operating point. That is, the step-variable transmission 20 to be placed in a selected one of the AT gear positions and the continuously variable transmission 18 functioning as a continuously variable transmission cooperate to provide the transmission device 40 in which the continuously variable transmission 18 (differential mechanism 32) and the step-variable transmission 20 are disposed in series with each other and which functions as a continuously variable transmission as a whole.

Alternatively, the continuously variable transmission 18 can be shifted like a step-variable transmission. Accordingly, the transmission device 40 constituted by the step-variable transmission 20 to be placed in one of the AT gear positions and the continuously variable transmission 18 which can be shifted like the step-variable transmission can be shifted like a step-variable transmission as a whole. That is, the step-variable transmission 20 and the continuously variable transmission 18 can be controlled to selectively establish a plurality of speed positions (hereinafter referred to as "overall speed positions" although it may be referred also to as "conceptual speed positions") having respective different values of a speed ratio γt (=ωe/ωo) which is a ratio of the engine speed ωe to the output shaft speed ωe. The speed ratio γt is an overall speed ratio of the transmission device 40 consisting of the continuously variable transmission 18 and the step-variable transmission 20 which are disposed in series with each other. The overall speed ratio γt is equal to a product of the speed ratio γ0 of the continuously variable transmission 18 and the speed ratio γat of the step-variable transmission 20, namely, γt=γ0*γat.

Figures 4, 5:
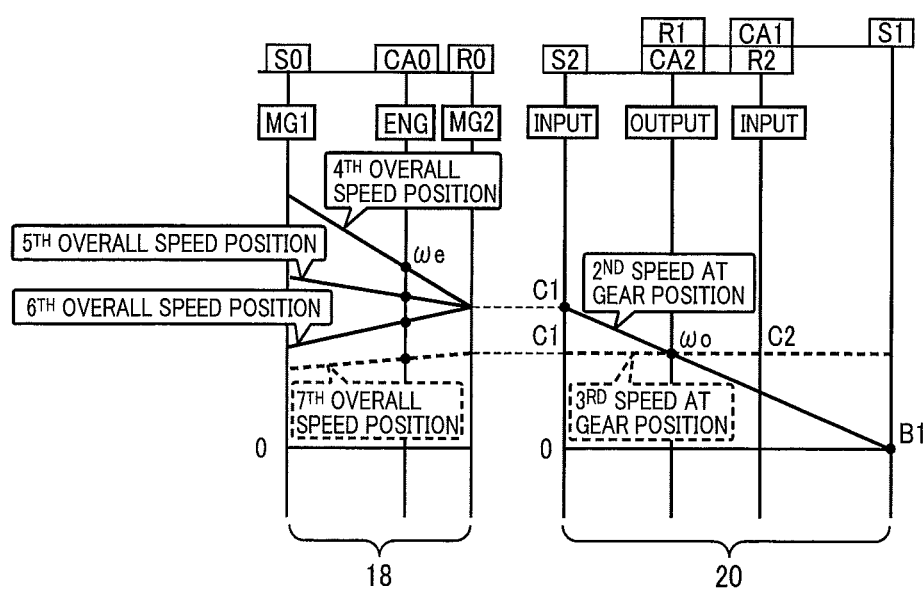
FIG. 4 is a table indicating an example of a plurality of overall speed positions of a transmission device in relation to the AT gear positions of the step-variable transmission.
FIG. 5 is a view indicating some examples of the AT gear positions of the step-variable transmission and some examples of the overall speed positions of the transmission device, on a collinear chart similar to that of FIG. 3.

At least one overall speed position is provided for each of the four AT gear positions of the step-variable transmission 20, with a combination of each AT gear position with at least one of the different speed ratio values γ0 of the continuously variable transmission 18. FIG. 4 is the table indicating an example of the overall speed positions of the transmission device 40, wherein the first through third overall speed positions are established for the first speed AT gear position, the fourth through sixth overall speed positions are established for the second speed AT gear position, the seventh through ninth overall speed positions are established for the third speed AT gear position, and the tenth, overall speed position is established, for the fourth speed AT gear position.

FIG. 5 is the view indicating some examples of the AT gear positions of the step-variable transmission 20 and some examples of the overall speed positions of the transmission device 40, on a collinear chart similar to that of FIG. 3. In FIG. 5, solid lines indicate the fourth through sixth overall speed positions established when the step-variable transmission 20 is placed in the second speed AT gear position. In the transmission device 40, the continuously variable transmission 18 is controlled to control the engine speed ωe with respect to the output shaft speed ω for establishing the predetermined overall speed ratio values γt, to thereby establish the different overall speed position or positions for each of the AT gear positions. A broken line indicates the seventh overall speed position established when the step-variable transmission 20 is placed in the third speed AT gear position. In the transmission device 40, the continuously variable transmission 18 is controlled according to the selected one of the AT gear positions, for shifting the transmission device 40 from one of the overall speed positions to another.

The vehicle 10 is provided with the control apparatus in the form of the electronic control device 80 for controlling the engine 14, the continuously variable transmission 18 and the step-variable transmission 20. FIG. 1 shows input signals and output signals of the electronic control device 80, and major control portions' of the electronic control device 80. The electronic control device 80 includes a so-called microcomputer incorporating a CPU, a RAM, a ROM and an input/output interface. The CPU implements various controls of the vehicle 10, by performing signal processing operations according to control programs stored in the ROM while utilizing a temporary data storage function of the RAM. The electronic control device 80 consists of separate control units provided as needed, such as an engine control unit, and a transmission shifting control unit.

The electronic control device 80 is configured to receive various input signals from various sensors provided on the vehicle 10, such as: an output signal of an engine speed sensor 60 indicative of the engine speed ωe an output signal of an MG1 speed sensor 62 indicative of the MG1 speed ωg which is the operating speed of the first motor/generator MG1; an output signal of an MG2 speed sensor 64 indicative of the MG2 speed ωm which is the input shaft speed ωi; an output signal of an output shaft speed sensor 66 indicative of the output shaft speed ωo corresponding to the vehicle running speed V; an output signal of an accelerator pedal operation amount sensor 68 indicative of the operation amount θacc of a vehicle accelerating member in the form of the accelerator pedal, which operation amount θacc represents a degree of acceleration of the vehicle 10 required by the vehicle operator; an output signal of a throttle valve opening angle sensor 70 indicative of an angle θth of opening of an electronic throttle valve; an output signal of an acceleration (G) sensor 72 indicative of a longitudinal acceleration value G of the vehicle 10; an output signal of a shift position sensor 74 indicative of an operating position POSsh of a manually operated shifting member in the form of a shift lever 56 provided on the vehicle 10; an output signal of a battery sensor 76 indicative of a temperature THbat, a charging/discharging electric current Ibat and a voltage Vbat of the battery 52; an output signal of an oil temperature sensor 78 indicative of a temperature THoil of a working fluid used for operating hydraulic actuators of the coupling devices CB; an output signal of an intake air quantity sensor 79 indicative of an intake air quantity Qair of the engine 14; and an output signal of a cooling water temperature sensor 81 indicative of a temperature Tw of a cooling water of the engine 14.

Further, the electronic control device 80 generates various output signals to the various devices provided on the vehicle 10, such as: an engine control command signal Se to be applied to an engine control device 58 provided to control a throttle actuator, a fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54 provided to control the operating states of the coupling devices CB (namely, for controlling the shifting actions of the step-variable transmission 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current as a hydraulic control command corresponding to the hydraulic pressure command value.

The electronic control device 80 is configured to calculate a charging state (stored electric power amount) SOC (%) of the battery 52 on the basis of the charging/discharging electric current Ibat and the voltage Vbat of the battery 52. The electronic control device 80 is further configured to calculate, based on, for example, the temperature THbat and the charging state SOC (stored electric power amount) of the battery 52, a maximum charging amount Win of electric power that can be further stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a transmission shifting control portion 82 functioning as shifting control means, and a hybrid control portion 84 functioning as hybrid control means, for performing various controls of the vehicle 10.

The transmission shifting control portion 82 is configured to determine a shifting action of the step-variable transmission 20 according to a memory-stored AT gear position shifting map obtained by experimentation or determined by an appropriate design theory and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission 20. The AT gear position shifting map is a predetermined relationship having shifting lines (shift-up boundary lines and shift-down boundary lines) used to determine whether the step-variable transmission 20 should be shifted up or down. These shifting lines are defined in a two-dimensional coordinate system in which the output shaft speed ωo (equivalent to the vehicle running speed V) and the accelerator pedal operation amount θacc (equivalent to a required drive torque Tdem or throttle valve opening angle θth) are taken as two variables along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signal Se represents a command target value of an engine power Pe (engine output Pe) which is a power of the engine 14 (required engine power Pedem) outputting the engine torque Te at its present operating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and a command value of an electric power amount Wm to be consumed by the second motor/generator MG2 to generate the MG2 torque Tm at the present MG2 speed ωm.

When the transmission device 40 as a whole is operated as the continuously variable transmission while the continuously variable transmission 18 is operated as the continuously variable transmission, for instance, the hybrid control portion 84 controls the engine 14 and the electric power amount Wg to be generated by the first motor/generator MG1, so as to establish the engine speed ωe and the engine torque Te for obtaining the engine power Pe to establish the required vehicle drive power Pdem, while taking account of a highest fuel economy point of the engine 14, so that the speed ratio γ0 of the continuously variable transmission 18 is controlled so as to be continuously varied. As a result, the speed ratio γt of the transmission device 40 is controlled while the continuously variable transmission 18 is operated as the continuously variable transmission.

When the transmission device 40 as a whole is operated as the step-variable transmission while the continuously variable transmission 18 is operated as the step-variable transmission, for instance, the hybrid control portion 84 determines a shifting action of the transmission device 40 according to an overall speed position shifting map, for example, and performs a shifting control of the continuously variable transmission 18 to establish a selected one of the plurality of overall speed positions, in cooperation with the transmission shifting control portion 82 to shift the step-variable transmission. 20 selectively to the AT gear positions. The plurality of overall speed positions can be established by controlling the first motor/generator MG1 to control the engine speed ωe according to the output shaft speed ωo so as to maintain the respective speed ratio values γt. It is noted that the speed ratio γt in each of the overall speed positions does not necessarily have to be constant over all ranges of the output shaft speed ωo, but may be changed in a predetermined range or ranges of the output shaft speed ωo or may be given a limitation or limitations, for example, depending on upper and lower limits of rotating speeds of respective rotatable elements.

Figure 6:
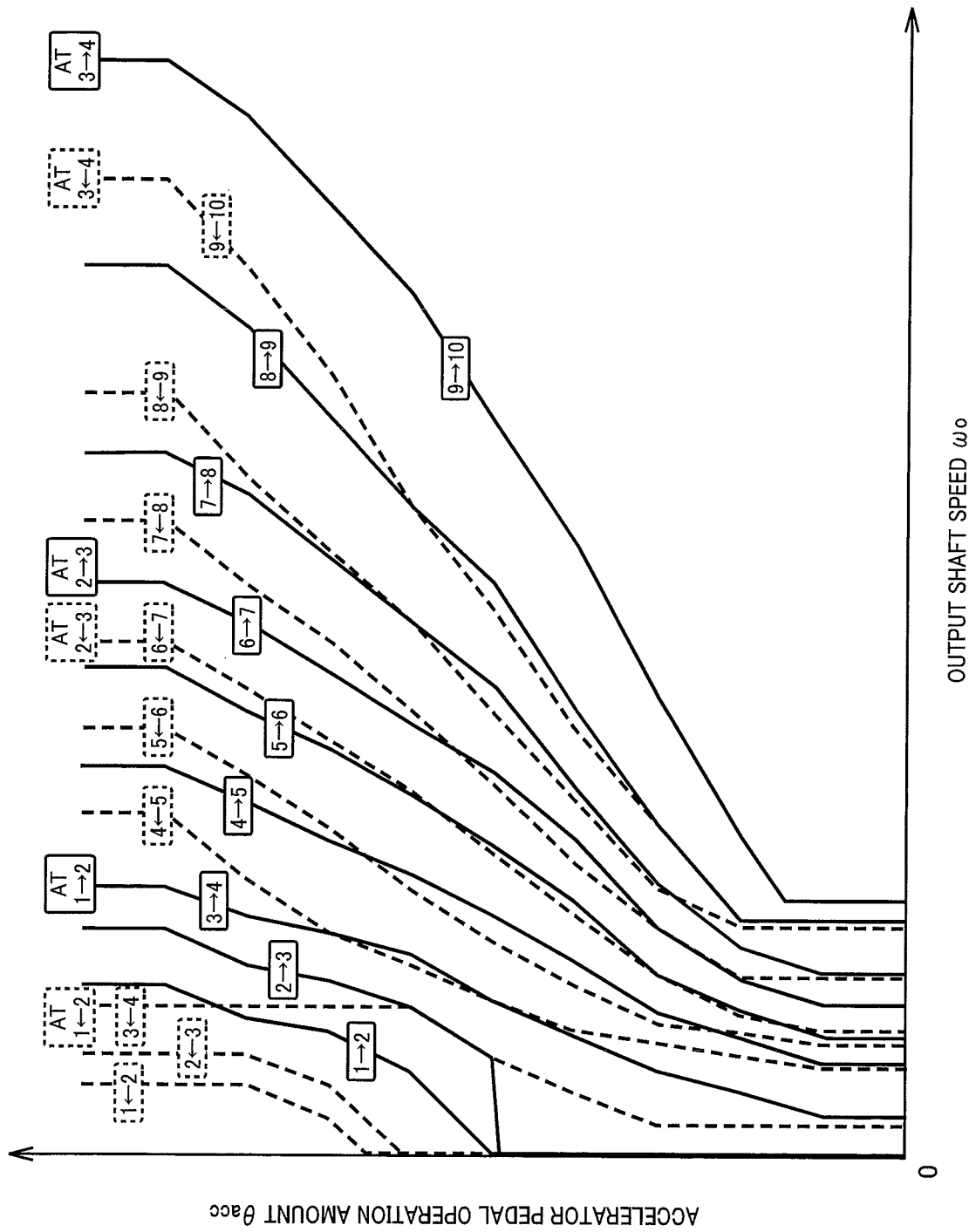
FIG. 6 is a view illustrating an example of an overall speed position shifting map used to shift the transmission device to a selected one of the plurality of overall speed positions.

The above-indicated overall speed position shifting map is a relationship between the output shaft speed ωo and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission 18 and the step-variable transmission 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted, or inhibited.

The overall step-variable shifting control by the hybrid control portion 84 and the shifting control of the step-variable transmission 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission 20 is shifted between the second speed AT gear position and the first speed AT gear position. When the transmission device 40 is shifted between the seventh overall speed position and the sixth overall speed position, the step-variable transmission 20 is shifted between the third speed AT gear position and the second speed AT gear position. When the transmission device 40 is shifted between the tenth overall speed position and the ninth overall speed position, the step-variable transmission 20 is shifted between the fourth speed AT gear position and the third speed AT gear position. In this respect, reference is made to FIG. 4.

Therefore, the AT gear position shifting map of FIG. 6 is formulated so that the AT gear position shifting operation is performed in synchronization with the overall speed position shifting operation. Described more specifically by reference to FIG. 6, the shift-up boundary lines for respectively shifting the transmission device 40 from the third overall speed position to the fourth overall speed position, from the sixth overall speed position to the seventh overall speed position, and from the ninth overall speed position to the tenth overall speed position coincide with the shift-up boundary lines for respectively shifting the step-variable transmission 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, the shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission 20 from the second speed AT gear position to the first speed AT gear position (indicated as "AT1←2" in FIG. 6), from the third speed AT gear position to the second speed AT gear position, and from the fourth speed AT gear position to the third speed AT gear position.

Alternatively, a command to shift the step-variable transmission 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission 20, and a shift-down action of the transmission device 40 as a whole takes place upon a shift-down action of the step-variable transmission 20. The transmission shifting control portion 82 commands the step-variable transmission 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission 20 is performed with a change of the engine speed ωe, so that the vehicle operator is less likely to uncomfortably recognize a shifting shock of the step-variable transmission 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

As indicated in the table of FIG. 2, the clutch C1, the brake B2 and the one-way clutch OWC are placed in their engaged state during running of the vehicle 10 while the step-variable transmission 20 is placed in the first speed AT gear position. In this respect, it is noted that the brake B2 need not be placed in the engaged state to permit the step-variable transmission 20 to be placed in the first speed AT gear position during a normal running of the vehicle 10. However, the brake B2 disposed parallel with the one-way clutch OWC is placed in the engaged state even during normal running of the vehicle 10, in order to prevent a releasing action of the one-way clutch OWC and a consequent failure of the step-variable transmission 20 to be placed in the first speed AT gear position, in the event of switching of the running mode of the vehicle 10 from the normal run to a coasting run, and to permit quick initiation of a regenerative control of the second motor/generator MG2. It is noted that the normal run of the vehicle 10 means running of the vehicle 10 with at least one of drive forces of the engine 14 and the second motor/generator MG2, while the coasting run of the vehicle 10 means running of the vehicle 10 while a reverse or negative drive torque is transmitted in a direction from the drive wheels 28 toward the step-variable transmission 20, as a result of a releasing operation of the accelerator pedal, for instance. It is noted that the brake B2 is a coupling device disposed parallel with the one-way clutch OWC of the step-variable transmission 20 to be controlled by the control apparatus according to the present invention.

By the way, a shifting control to bring the brake B2 into its released state and to bring the brake B1 into its engaged state is implemented to shift the step-variable transmission 20 from the first speed AT gear position to the second speed AT gear position as a result of a depressing operation of the accelerator pedal. To implement this shift-up action of the step-variable transmission 20, it is desirable to quickly bring the brake B2 into its released state. During running of the vehicle 10 on a wavy or any other bumpy roadway, however, the shift-up action may cause generation of resonance in the step-variable transmission 20, which causes application of an excessively large input torque to the step-variable transmission 20. This resonance may also cause application of an excessively large torque also to the one-way clutch OWC due to the fluctuation, giving rise to a risk of reduction of durability of the one-way clutch OWC.

On the other hand, the risk of reduction of durability of the one-way clutch OWC can be reduced if the releasing action of the brake B2 is delayed from a moment of initiation of the shift-up action of the step-variable transmission 20, that is, if a commanded value of the hydraulic pressure to be applied to the brake B2 (hereinafter referred to as "releasing hydraulic pressure Pb2") is kept at a predetermined hold-pressure value for a predetermined time period, so that a part of the input torque of the step-variable transmission 20 is transmitted through the brake B2, whereby the torque applied to the one-way clutch OWC is reduced. Where the accelerator pedal is released toward its non-operated position during the shift-up action, however, the AT input torque Ti of the step-variable transmission 20 which is the required torque of the vehicle 10 represented by the operation amount θacc of the accelerator pedal is quickly reduced, and the reduction (drop) of the releasing hydraulic pressure Pb2 of the brake B2 is delayed, so that the releasing hydraulic pressure Pb2 is excessively high, causing a difficult or unsmooth transfer of the input torque from the brake B2 to the brake B1, whereby the step-variable transmission 20 is placed in a so-called "tie-up" state. Initiation of the inertia phase of the shift-up action in this tie-up state gives rise to a risk of generation of a shifting shock of the step-variable transmission 20 upon initiation of the inertia phase.

Figure 7:
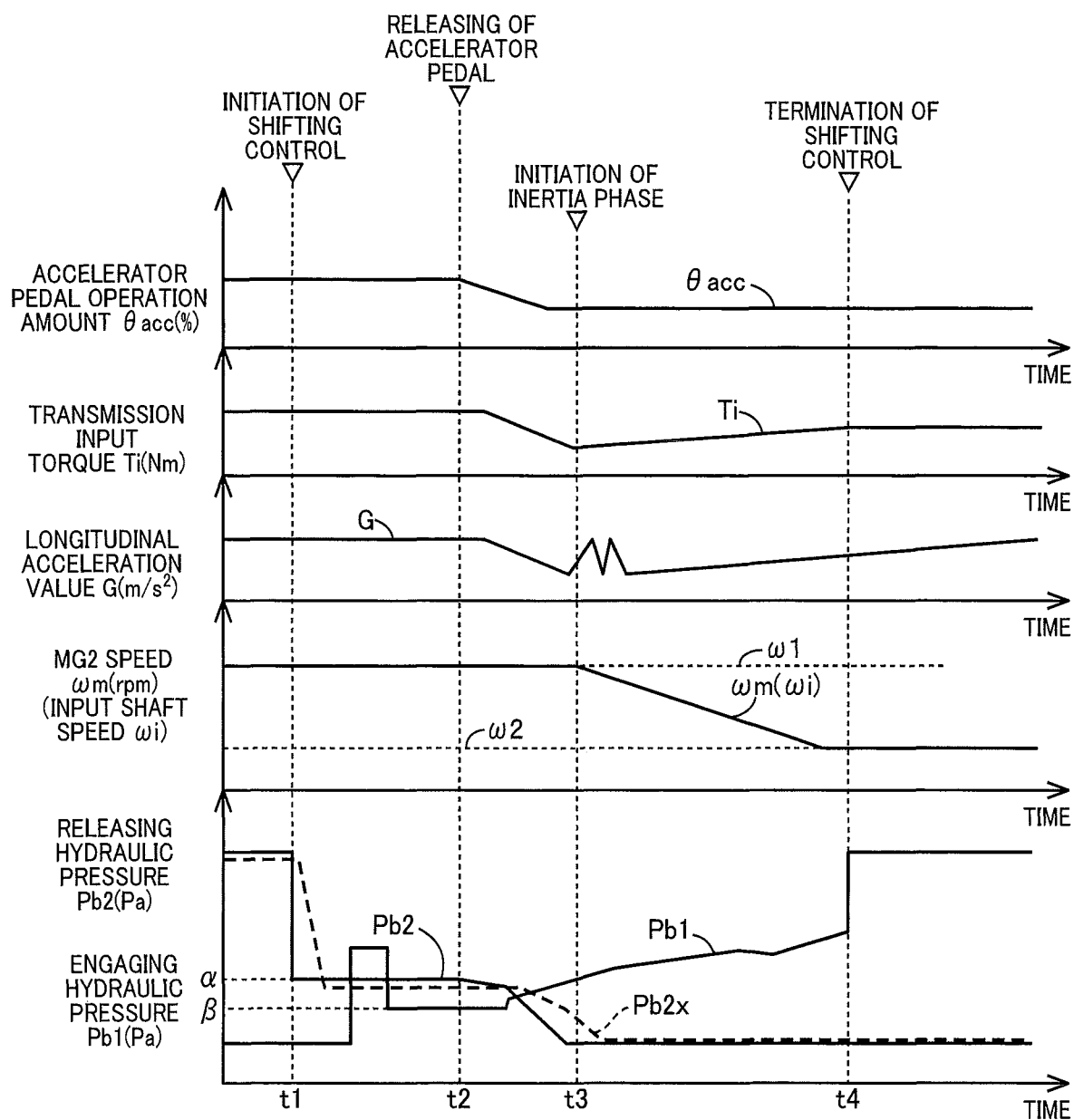
FIG. 7 is a time chart showing an example of changes of various parameters when a conventional control of coupling devices of the step-variable transmission is implemented when an accelerator pedal is released to its non-operated position in the process of a shift-up action of the step-variable transmission from its first speed AT gear position to its second speed AT gear position.

The problem indicated above will be explained by reference to the time chart of FIG. 7, which shows an example of changes of various parameters when a conventional control of the brakes B1 and B2 is implemented when the accelerator pedal is released to its non-operated position in the process of the shift-up action of the step-variable transmission 20 from its first speed AT gear position to its second speed AT gear position. In the time chart of FIG. 7, the time is taken along a horizontal axis while various parameters are taken along a vertical axis. The various parameters consist: the accelerator pedal operation amount θacc; the required vehicle drive force (required torque) in the form of the AT input torque Ti; the longitudinal acceleration value G of the vehicle 10; the MG2 speed ωm (i.e., input shaft speed ωi); an engaging hydraulic pressure Pb1 (commanded value) of the engaging-side coupling device CB in the form of the brake B1; and the releasing hydraulic pressure Pb2 (commanded value) of the releasing-side coupling device CB in the form of the brake B2. The parameters are indicated in the order of description from the top of the time chart. In the time chart, "t1" represents a moment of initiation of a shifting control of the step-variable transmission 20 (namely, a point of generation of the hydraulic control command signals Sat), while "t2" represents a moment of initiation of the releasing action of the accelerator pedal. Further, "t3" represents the moment of initiation of the inertia phase of the shift-up action while "t4" represents a moment of termination of the shifting control.

When the shifting control to implement the shift-up action of the step-variable transmission 20 is initiated at the point of time t1, the releasing hydraulic pressure Pb2 (commanded value) of the brake B2 is reduced to a predetermined hold-pressure value α, as indicated by a solid line. After the releasing hydraulic pressure Pb2 has been kept at the hold-pressure value α for a predetermined length of time, the releasing hydraulic pressure Pb2 is gradually reduced toward zero. A broken line indicates an actual value of the releasing hydraulic pressure Pb2 (hereinafter referred to as "actual releasing hydraulic pressure Pb2x"). The actual releasing hydraulic pressure Pb2x follows the commanded value indicated by the solid line, with a given time lag. The engaging hydraulic pressure Pb1 (commanded value) of the brake B1 indicated by a solid line is temporarily raised (to implement a quick fill of the actuator of the brake B1) at a point of time which is a predetermined delay time from the point of time t1. Then, the engaging hydraulic pressure Pb1 is held at a predetermined hold-pressure value β, and is then gradually raised.

As a result of initiation of the releasing action of the accelerator pedal at time t2 and consequent initiation of reduction of the accelerator pedal operation amount θacc, the AT input torque Ti and the acceleration value G of the vehicle 10 are accordingly reduced. At the point of time t3 at which the inertia phase of the shift-up action is initiated, the actual releasing hydraulic pressure Pb2x is excessively high with respect to the AT input torque Ti, which has been reduced according to the releasing action of the accelerator pedal initiated at the point of time t2. Consequently, the step-variable transmission 20 is placed in the tie-up state. As a result, the longitudinal acceleration value G fluctuates in an oscillating manner shortly after the point of time t3 at which the inertia phase of the shift-up action is initiated, so that the shifting shock of the step-variable transmission 20 takes place.

To solve the problem described above, the electronic control device 80 is configured to control the shift-up action of the step-variable transmission 20 as described below, so as to reduce the risk of generation of the shifting shock while reducing the risk of reduction of durability of the one-way clutch OWC. The control of the shift-up action of the step-variable transmission 20 will be primarily described.

The electronic control device 80 includes inertia phase determining means in the form of an inertia phase determining portion 86, required torque determining means in the form of a required torque determining portion 88, hold-pressure setting means in the form of a hold-pressure setting portion 90, and provisional hold-time setting means in the form of a provisional hold-time setting portion 92. It is noted that the transmission shifting control portion 82, the required torque determining portion 88 and the hold-pressure setting portion 90 correspond to a control portion of the control apparatus of the present invention.

The inertia phase determining portion 86 is configured to determine whether the shift-up action of the step-variable transmission 20 from the first speed AT gear position to the second speed AT gear position, which shift-up action has been initiated, is in a state prior to the moment of initiation of the inertia phase. For example, the inertia phase determining portion 86 calculates a difference Δω (=|γ1*ωo−ωi|) between a first speed gear position synchronizing speed ω1 (=γ1*ωo) calculated from a gear ratio γ1 of the first speed AT gear position of the step-variable transmission 20 and the output shaft speed ωo, and the input shaft speed ωi detected by the MG2 speed sensor 64. The difference Δω to be calculated is its absolute value. The inertia phase determining portion 86 then determines whether the calculated difference Δω is equal to or smaller than a predetermined value A. The inertia phase determining portion. 86 determines that the shift-up action is in the state prior to the moment of initiation of the inertia phase, when the difference Δω is equal to or smaller than the predetermined value A, and determines that the shift-up action is in a state after the moment of initiation of the inertia phase when the difference Δω exceeds the predetermined value A. The predetermined value A, which is obtained by experimentation or theoretical analysis, is set to be a small value below which it can be determined that the shift-up action is in the state prior to the moment of initiation of the inertia phase.

The required torque determining portion 88 is configured to calculate the AT input torque Ti as the required torque of the vehicle 10, and to determine whether the calculated AT input torque Ti is equal to or smaller than a predetermined value K. The predetermined value K, which is obtained by experimentation and theoretical analysis, is set to be a value below which the torque applied to the one-way clutch. OWC is equal to or smaller than a predetermined permissible value (OWC limit value Tallow referred to below) and below which there arises no risk of reduction of the durability of the one-way clutch OWC, even where there arises resonance in the step-variable transmission 20 during shift-up action from the first gear speed to the second gear speed of the AT gear position. The AT input torque Ti is a base value of the required torque (base required torque value) calculated from time to time on the basis of the engine torque Te, MG1 torque Tg, MG2 torque Tm and gear ratio ρ of the differential mechanism 32. This AT input torque Ti is a requited torque of the vehicle 10 to be controlled by the control apparatus of the present invention.

Figure 8:
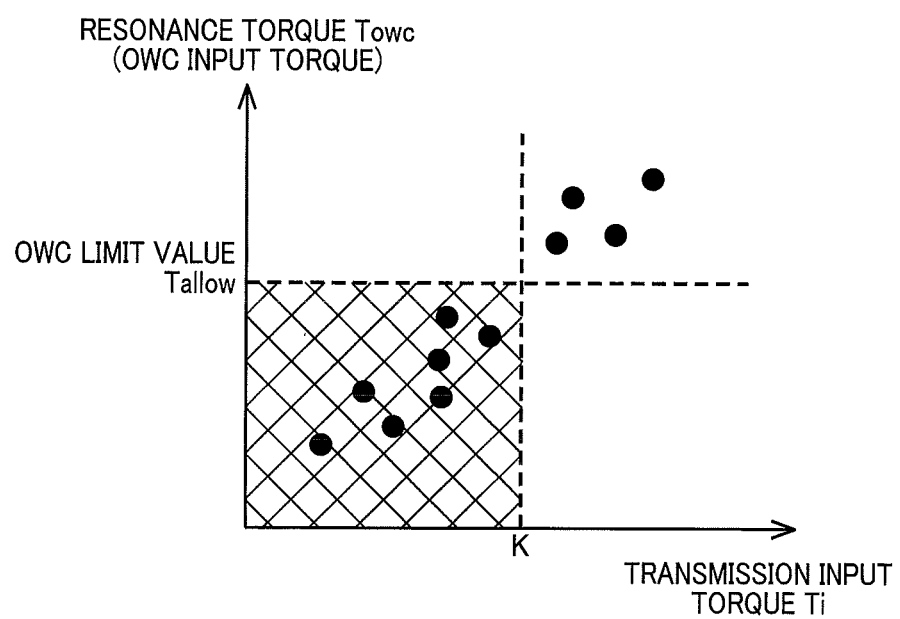
FIG. 8 is a view indicating a relationship between an input torque of the step-variable transmission and a resonance torque.

FIG. 8 is the view indicating a relationship between the AT input torque Ti and a resonance torque Towc applied to the one-way clutch OWC. The resonance torque Towc is a torque applied to the one-way clutch OWC (OWC input torque) in the event of generation of resonance in the step-variable transmission 20 in the process of its shift-up action. The OWC limit value Tallow in FIG. 8 is a permissible upper limit of the OWC input torque in view of durability of the one-way clutch OWC, above which there is a risk of reduction of durability of the one-way clutch OWC.

In FIG. 8, black dots indicate points of relationship between the AT input torque Ti and the resonance torque Towc. As indicated in FIG. 8, the AT input torque Ti and the resonance torque Towc are almost proportional with each other. Namely, the resonance torque Towc is a sum of a torque increasing with an increase of the AT input torque Ti, and a torque periodically fluctuating due to the resonance.

The resonance torque Towc is smaller than the OWC limit value Tallow when the AT input torque Ti is equal to or smaller than the predetermined value K, and is larger than the OWC limit value Tallow when the AT input torque Ti is larger than the predetermined value K. An area in which the AT input torque Ti is equal to or smaller than the predetermined value K while the resonance torque Towc is smaller than the OWC limit value Tallow is indicated by cross-hatched lines. When the AT input torque Ti is equal to or smaller than the predetermined value K, the resonance torque Towc is smaller than the OWC limit value Tallow, there is a reduced risk of reduction of durability of the one-way clutch OWC. Namely, the predetermined value K of the AT input torque Ti is set to be a value below which the resonance torque Towc is smaller than the OWC limit value Tallow.

When the AT input torque Ti is equal to or smaller than the predetermined value K, the required torque determining portion 88 determines that the resonance torque Towc applied to the one-way clutch OWC is smaller than the OWC limit value Tallow even if the brake B2 is brought into its released state (fully released state) in the process of the shift-up action of the step-variable transmission 20 (prior to the moment of initiation of its inertia phase). In this case, the required torque determining portion 88 commands the transmission shifting control portion 82 to zero the releasing hydraulic pressure Pb2 (commanded value) of the brake B2, for bringing the brake B2 into its released state. In response to this command from the required torque determining portion 88, the transmission shifting control portion 82 applies the hydraulic control command signal Sat to the hydraulic control unit 54, for zeroing the releasing hydraulic pressure Pb2 of the brake B2. As a result, the actual releasing hydraulic pressure Pb2x of the brake B2 is reduced to zero or a substantially zero value, to bring the brake B2 into its released state prior to the moment of initiation of the inertia phase, so that it is possible to prevent the step-variable transmission 20 from being placed in the tie-up state due to an excessively high value of the actual releasing hydraulic pressure Pb2x, whereby the risk of generation of the shifting shock upon initiation of the inertia phase can be reduced. Further, when the AT input torque Ti is equal to or smaller than the predetermined value K, the one-way clutch OWC does not suffer from a risk of reduction of its durability since the resonance torque Towc applied to the one-way clutch OWC is smaller than the OWC limit value Tallow.

When the AT input torque Ti is larger than the predetermined value K, the required torque determining portion 88 determines that the resonance torque Towc applied to the one-way clutch OWC is larger than the OWC limit value Tallow if the brake B2 is brought into its released state in the process of the shift-up action of the step-variable transmission 20 (prior to the moment of initiation of its inertia phase). In this case, the required torque determining portion 88 commands the transmission shifting control portion 82 to delay the releasing action (fully releasing action) of the brake B2 with respect to that in the case where the AT input torque Ti is equal to or smaller than the predetermined value K. Namely, the required torque determining portion 88 commands the transmission shifting control portion 82 to apply the hydraulic control command signal Sat to the hydraulic control unit 54, for keeping the releasing hydraulic pressure Pb2 (commanded value) of the brake B2 at the predetermined hold-pressure value a higher than zero. In response to this command from the required torque determining portion 88, the transmission shifting control portion 82 applies the hydraulic control command signal Sat to the hydraulic control unit 54, for keeping the releasing hydraulic pressure Pb2 of the brake B2 at the predetermined hold-pressure value $\alpha$. As a result, a part of the AT input torque Ti is transmitted through the brake B2, whereby the resonance torque Towc applied to the one-way clutch OWC is reduced. Accordingly, the risk of reduction of the durability of the one-way clutch OWC is reduced.

The hold-pressure setting portion 90 is configured to set the above-indicated predetermined hold-pressure value $\alpha$. Described more specifically, the hold-pressure setting portion 90 sets the hold-pressure value $\alpha$ so as to be low enough to prevent the torque applied to the one-way clutch OWC, from exceeding the OWC limit value Tallow even in the event of generation of resonance in the step-variable transmission 20 prior to the moment of initiation of the inertia phase of its shift-up action. For example, the torque applied to the one-way clutch OWC increases with an increase of the AT input torque Ti. Accordingly, the hold-pressure setting portion 90 increases the predetermined hold-pressure value $\alpha$ with an increase of the AT input torque Ti, so that the torque applied to the one-way clutch OWC does not exceed the OWC limit value Tallow even when the AT input torque Ti is relatively high. For instance, the hold-pressure setting portion 90 stores therein a map representative of a relationship between the AT input torque Ti and the predetermined hold-pressure value $\alpha$, and determines the hold-pressure value $\alpha$ on the basis of the AT input torque Ti and according to the stored map. This map is obtained by experimentation or theoretical analysis, such that the hold-pressure value $\alpha$ increases in proportion to the AT input torque Ti.

The hold-pressure setting portion 90 may change the predetermined hold-pressure value $\alpha$ according to the temperature THoil of the working fluid used to operate the brake B2, and the vehicle running speed V, as well as the AT input torque Ti. For example, a control response of the hydraulic pressure applied to the actuator of the brake B2 is reduced with a decrease of the working fluid temperature THoil, since the viscosity of the working fluid increases with the decrease of its temperature THoil. In view of this, the hold-pressure setting portion 90 decreases the predetermined hold-pressure value $\alpha$ with a decrease of the working fluid temperature THoil, so that the actual releasing hydraulic pressure Pb2x is rapidly reduced to zero when the commanded releasing hydraulic pressure Pb2 is reduced from the hold-pressure value $\alpha$ to zero. Further, a degree of the fluctuation due to resonance of the step-variable transmission 20 generated in the process of its shift-up action increases with an increase of the vehicle running speed V. In view of this, the hold-pressure setting portion 90 increases the predetermined hold-pressure value $\alpha$ with an increase of the vehicle running speed V.

For example, the hold-pressure setting portion 90 stores therein a map representative of a relationship of the predetermined hold-pressure value $\alpha$ with respect to the AT input torque Ti, the working fluid temperature Moil and the vehicle running speed V, and determines the predetermined hold-pressure value $\alpha$ on the basis of the AT input torque Ti, working fluid temperature THoil and vehicle running speed V, and according to the stored map. This map is obtained by experimentation or theoretical analysis, such that the predetermined hold-pressure value $\alpha$ increases with an increase of the AT input torque Ti, decreases with a decrease of the working fluid temperature THoil, and increases with an increase of the vehicle running speed V, for instance.

Further, the hold-pressure setting portion 90 may be configured to implement compensation of the hold-pressure value $\alpha$ once obtained on the basis of the AT input torque Ti, by multiplying the obtained hold-pressure value α by a compensating coefficient set according to at least one of the working fluid temperature THoil and the vehicle running speed V, for thereby compensating the hold-pressure value α while taking account of the working fluid temperature THoil and/or the vehicle running speed V. The compensating coefficient indicated above is set so as to decrease with an increase of the working fluid temperature THoil, and so as to increase with an increase of the vehicle running speed V.

After the predetermined hold-pressure value α has been set, the hold-pressure setting portion 90 commands the transmission shifting control portion 82 to apply the hydraulic control command signal Sat to the hydraulic control unit 54, for reducing the releasing hydraulic pressure Pb2 of the brake B2 to the predetermined hold-pressure value α. In response to this command from the hold-pressure setting portion 90, the transmission shifting control portion 82 commands the hydraulic control unit 54 to control the releasing hydraulic pressure Pb2 of the brake B2 to the predetermined hold-pressure value α, so that the torque applied to the one-way clutch OWC is held not higher than the OWC limit value Tallow.

The provisional hold-time setting portion 92 is configured to set a provisional hold time tkeep during which the releasing hydraulic pressure Pb2 of the brake B2 is kept at the predetermined hold-pressure value α from the moment of initiation of the shift-up action of the step-variable transmission 20. The hold time tkeep is set to be shorter than a length of time from the moment of initiation of the shift-up action to the moment of initiation of its inertia phase. The provisional hold-time setting portion 92 changes the hold time tkeep according to the AT input torque Ti and the working fluid temperature THoil. For example, the provisional hold-time setting portion 92 changes the hold time tkeep such that the hold time tkeep decreases with a decrease of the AT input torque Ti, and with a decrease of the working fluid temperature THoil. For instance, the provisional hold-time setting portion 92 stores therein a map representative of a relationship of the hold time tkeep with respect to the AT input torque Ti and the working fluid temperature THoil, and sets the hold time tkeep on the basis of the AT input torque Ti and the working fluid temperature THoil, and according to the stored map.

When the hold time tkeep set by the provisional hold-time setting portion 92 has passed from the moment of initiation of the shift-up action, the transmission shifting control portion 82 commands the hydraulic control unit 54 to gradually reduce the releasing hydraulic pressure Pb2 of the brake B2 from the predetermined hold-pressure value α toward zero. It is noted that the hold time tkeep is a value (upper limit value) provisionally set by the provisional hold-time setting portion 92, and the releasing hydraulic pressure Pb2 is reduced from the predetermined hold-pressure value α to zero to bring the brake B2 into its released state, before the provisionally set hold time tkeep has not passed, if it is determined in the process of the shift-up action that the AT input torque Ti has been reduced to or below the predetermined value K. Accordingly, where the AT input torque Ti has been reduced to or below the predetermined value K in the process of the shift-up action, the releasing hydraulic pressure Pb2 is actually kept at the predetermined hold-pressure value α for a length of time shorter than the hold time tkeep provisionally set by the provisional hold-time setting portion 92.

During a time period from the moment of initiation of the shift-up action of the step-variable transmission 20 to the moment of initiation of the inertia phase of the shift-up action, in other words, up to a point of time at which the hold time tkeep set by the provisional hold-time setting portion 92 has passed from the moment of initiation of the shift-up action, the required torque determining portion 88 continuously determines whether the AT input torque Ti is larger than the predetermined value K. Accordingly when the AT input torque Ti has been reduced from a value larger than the predetermined value K to or below the predetermined value K as a result of a releasing operation of the accelerator pedal during the shift-up action, for instance, the releasing hydraulic pressure Pb2 of the brake B2 is reduced to zero to bring the brake B2 into its released state. In this case, the actual releasing hydraulic pressure Pb2x is reduced to zero following the commanded releasing hydraulic pressure Pb2, the step-variable transmission 20 is prevented from being placed in a tie-up state prior to the moment of initiation of the inertia phase of the shift-up action.

The control to bring the brake B2 into its released state in response to the determination by the required torque determining portion 88 as described above has priority over the provisional setting of the hold time tkeep. That is, the releasing hydraulic pressure Pb2 of the brake B2 is controlled so as to be reduced to zero as soon as the AT input torque Ti has been reduced to or below the predetermined value K, even before the hold time tkeep has passed. Thus, the commanded releasing hydraulic pressure Pb2 is reduced to zero when the AT input torque Ti has been reduced to or below the predetermined value K prior to the moment of initiation of the inertia phase of the shift-up action, so that the actual releasing hydraulic pressure Pb2x is also reduced to zero or a substantially zero value at the moment of initiation of the inertia phase, whereby the step-variable transmission 20 is prevented from being placed in the tie-up state, while at the same time the risk of generation of the shifting shock upon initiation of the inertia phase is reduced.

Figure 9:
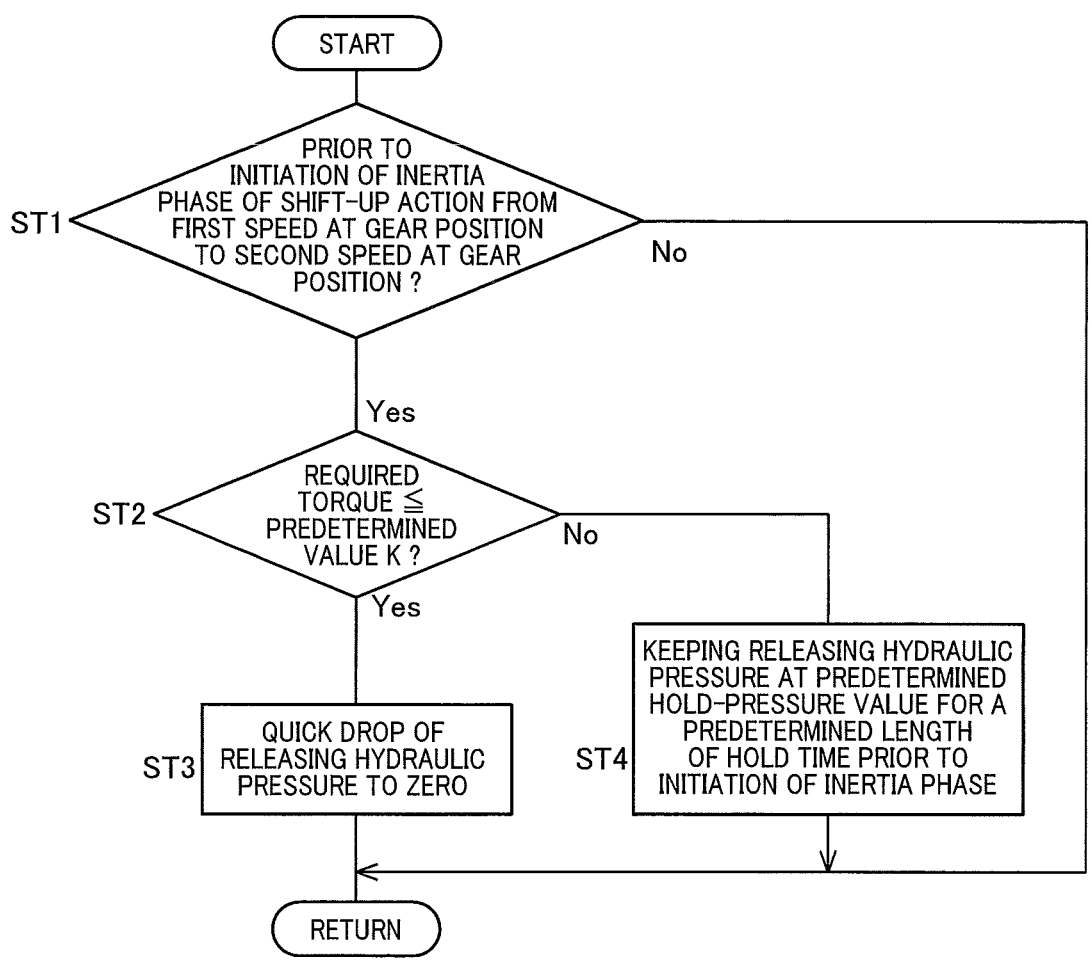
FIG. 9 is a flow chart illustrating an essential part of a control routine executed by the control apparatus in the form of an electronic control device shown in FIG. 1, namely, a control operation implemented so as to reduce a risk of reduction of durability of a one-way clutch and a risk of generation of a shifting shock of the step-variable transmission in the process of its shift-up action from its first speed AT gear position to its second speed AT gear position.

FIG. 9 is the flow chart illustrating an essential part of a control routine executed by the electronic control device 80, namely, a control operation implemented so as to reduce the risk of reduction of durability of the one-way clutch. OWC and the risk of generation of the shifting shock of the step-variable transmission 20 in the process of its shift-up action from its first speed AT gear position to its second speed AT gear position. This control operation is repeatedly performed during running of the vehicle 10.

The control operation is initiated with a step ST1 corresponding to a function of the inertia phase determining portion 86, to determine whether the step-variable transmission 20 is in the process of a shift-up action from the first speed AT gear position to the second speed AT gear position, while the shift-up action is prior to the moment of initiation of the inertia phase. If a negative determination is obtained in the step ST1, one cycle of execution of this control routine is terminated. If an affirmative determination is obtained in the step ST1, the control flow goes to a step ST2 corresponding to a function of the required torque determining portion 88, to determine whether the required torque of the vehicle 10 in the form of the AT input torque Ti is equal to or smaller than the predetermined value K (whether Ti≤K).

If an affirmative determination is obtained in the step ST2, the control flow goes to a step ST3 corresponding to a function of the transmission shifting control portion 82 and the function of the required torque determining portion 88, to reduce the releasing hydraulic pressure Pb2 of the brake B2 to zero, namely, to quickly drop the releasing hydraulic pressure Pb2 to zero for bringing the brake B2 into its released state. If a negative determination is obtained in the step ST2, the control flow goes to a step ST4 corresponding to the function of the transmission shifting control portion 82 and functions of the hold-pressure setting portion 90 and the provisional hold-time setting portion 92, to keep the releasing hydraulic pressure Pb2 at the predetermined hold-pressure value α for a maximum length of time provisionally set as the hold time tkeep. Thus, the releasing hydraulic pressure Pb2 is kept or held at the predetermined hold-pressure value α where the AT input torque Ti exceeds the predetermined value K, so that the risk of reduction of durability of the one-way clutch OWC due to an excessively large load acting thereon is reduced. Further, a risk of the step-variable transmission 20 being placed in a tie-up state due to an excessively high value of the actual releasing hydraulic pressure Pb2x is reduced by the control to zero the releasing hydraulic pressure Pb2 for bringing the brake B2 into its released state when the AT input torque Ti has been reduced to or below the predetermined value K in the process of the shift-up action (prior to the moment of initiation of the inertia phase), whereby the risk of generation of the shifting shock upon initiation of the inertia phase is reduced.

Figure 10:
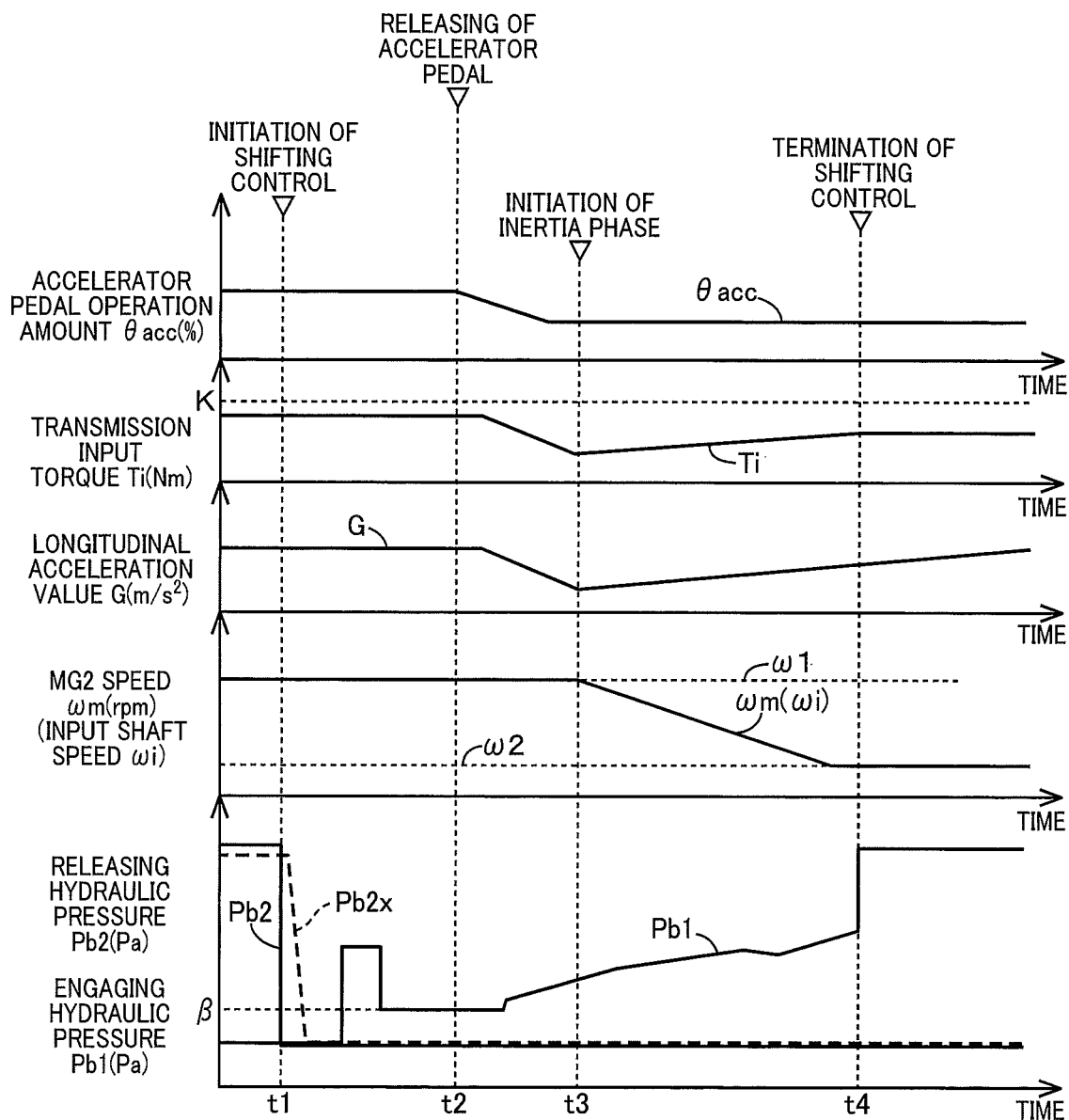
FIG. 10 is a time chart showing an example of changes of various parameters when the control operation illustrated in the flow chart of FIG. 9 is performed.

FIG. 10 is the time chart showing an example of changes of various parameters when the control operation illustrated in the flow chart of FIG. 9 is performed. The time chart of FIG. 10 shows the changes of the various parameters during a time period from the moment of initiation of control of the shift-up action of the step-variable transmission 20 to the moment at which the AT input torque Ti has been reduced to or below the predetermined value K (Ti≤K). In the time chart of FIG. 10, the time is taken along the horizontal axis, while the parameters are taken along the vertical axis, as described above with respect to the time chart of FIG. 7. In FIG. 10, "t1" represents a moment of initiation of control of the shift-up action (the moment of initiation of the shift-up action, or a moment of generation of the hydraulic control command signal Sat), "t2" represents the moment at which the releasing operation of the accelerator pedal is initiated, "t3" represents the moment of initiation of the inertia phase of the shift-up action, and "t4" represents the moment of termination of control of the shift-up action.

At the point of time t1 at which the control of the shift-up action of the step-variable transmission 20 is initiated, the commanded releasing hydraulic pressure Pb2 is reduced to zero, as indicated by a solid line in FIG. 10, since the AT input torque Ti at the point of time t1 is equal to or smaller than the predetermined value K. The actual releasing hydraulic pressure Pb2x indicated by a broken line is reduced toward zero, following the commanded releasing hydraulic pressure Pb2. The engaging hydraulic pressure Pb1 of the engaging-side coupling device CB in the form of the brake B1, indicated by a solid line, is temporarily raised (to fill the hydraulic actuator of the brake B1) at a point of time at which a predetermined delay time has passed after the point of time t1. Then, the engaging hydraulic pressure Pb1 is held at a predetermined hold-pressure value β and is subsequently gradually raised.

At the point of time t2, the releasing operation of the accelerator pedal is initiated to reduce the accelerator pedal operation amount θacc. As a result, the AT input torque Ti and the longitudinal acceleration value G of the vehicle 10 are reduced. At the point of time t3, the inertia phase of the shift-up action is initiated. Since the actual releasing hydraulic pressure Pb2x has already been reduced to zero at the point of time t3, the step-variable transmission 20 is not placed in a tie-up state, so that the risk of generation of the shifting shock of the step-variable transmission 20 after the moment of initiation of the inertia phase is reduced.

Figure 11:
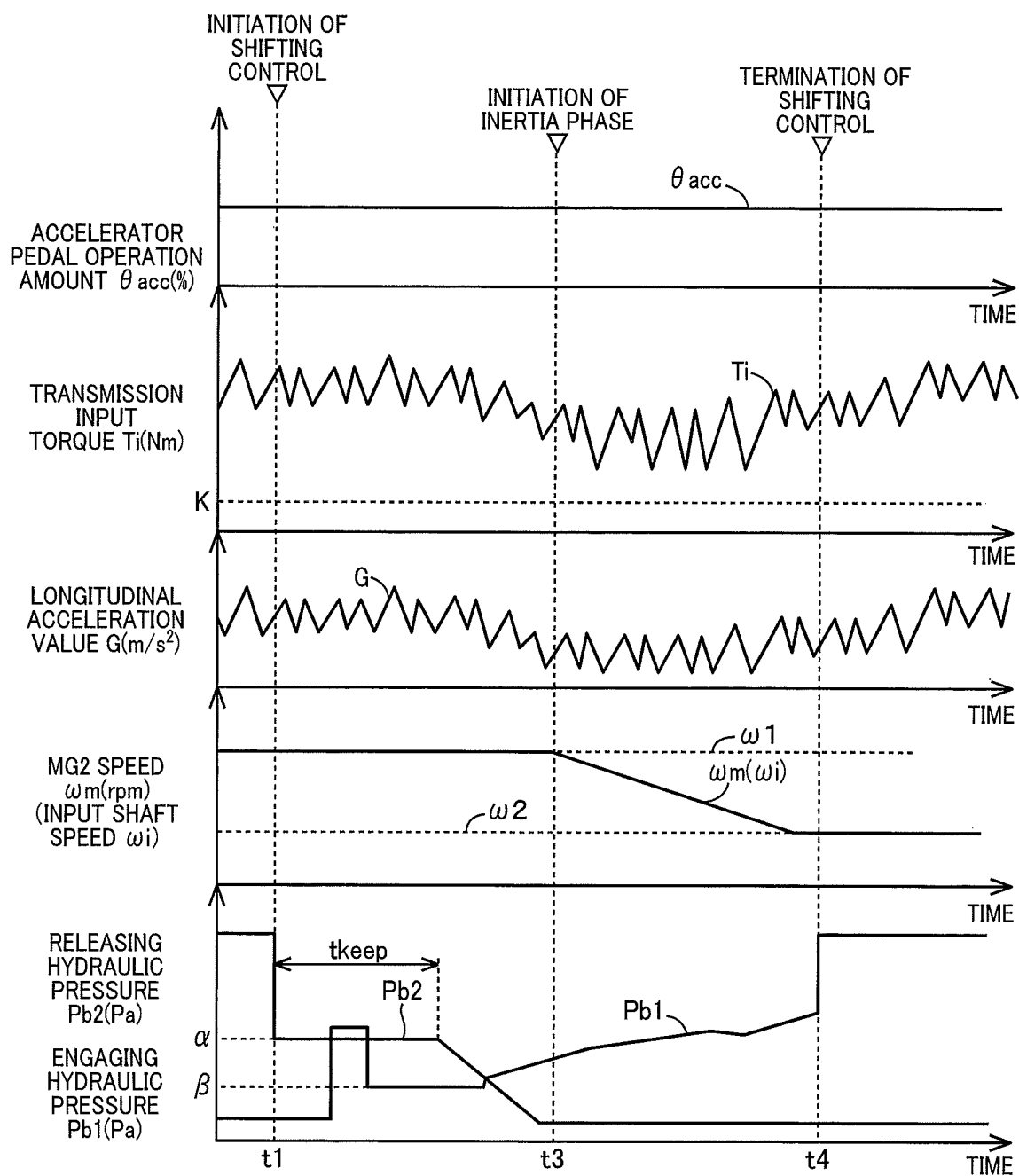
FIG. 11 is a time chart showing another example of changes of the various parameters when the control operation illustrated in the flow chart of FIG. 9 is performed.

FIG. 11 is the time chart showing another example of changes of the various parameters when the control operation illustrated in the flow chart of FIG. 9 is performed. The time chart of FIG. 11 shows the changes of the parameters where resonance takes place in the step-variable transmission 20 during running of the vehicle 10 on a wavy roadway; and the AT input torque Ti is larger than the predetermined value K at the moment of initiation of control of the shift-up action of the step-variable transmission 20.

At the point of time t1 indicated in FIG. 11 at which the control of the shift-up action of the step-variable transmission 20 is initiated, the AT input torque Ti is larger than the predetermined value K, so that the releasing hydraulic pressure Pb2 of the brake B2 is kept at the predetermined hold-pressure value α, as indicated by a solid line, so that the releasing action of the brake B2 is delayed with respect to that where the AT input torque Ti is equal to or smaller than the predetermined value K. When the hold time tkeep has passed after the point of time t1, the releasing hydraulic pressure Pb2 is gradually reduced toward zero. On the other hand, the engaging hydraulic pressure Pb1 of the brake B1 is temporarily raised (to fill the hydraulic actuator of the brake B1) when a predetermined delay time has passed after the point of time t1, and is subsequently held at a predetermined hold-pressure value β and then gradually raised.

As indicated in FIG. 11, resonance takes place in the step-variable transmission 20 before the moment of initiation of control of the shift-up action, so that the AT input torque Ti fluctuates in an oscillating manner while the longitudinal acceleration value G of the vehicle 10 fluctuates in an oscillating manner. If the brake B1 is placed in the released state at the point of time t1 in the above-described condition, the torque applied to the one-way clutch OWC would exceed the OWC limit value Tallow, so that the durability of the one-way clutch OWC would be reduced. However, the releasing hydraulic pressure Pb2 of the brake B2 is kept at the predetermined hold-pressure value α, so that the torque applied to the one-way clutch OWC is held not larger than the OWC limit value Tallow, whereby the risk of reduction of durability of the one-way clutch OWC is reduced.

The present embodiment of the invention described above is configured to delay the releasing action of the brake B2 where the AT input torque Ti prior to the moment of initiation of the inertia phase of the shift-up action of the step-variable transmission 20 is larger than the predetermined value K, with respect to the releasing action where the AT input torque Ti is not larger than the predetermined value K. Accordingly, the load acting on the one-way clutch OWC is reduced even in the event of generation of resonance in the step-variable transmission 20, so that the risk of reduction of durability of the one-way clutch OWC is reduced. Further, a relatively small load acts on the one-way clutch OWC where the AT input torque Ti is not larger than the predetermined value K, so that the brake B2 is more quickly brought into its released state than where the AT input torque Ti is larger than the predetermined value K. Accordingly, where the AT input torque Ti has been reduced to or below the predetermined value K as a result of a releasing operation of the accelerator pedal prior to the moment of initiation of the inertia phase of the shift-up action of the step-variable transmission 20, for instance, the brake B2 is quickly brought into its released state, so that the step-variable transmission 20 is prevented from being placed in the tie-up state, while at the same time the risk of generation of the shifting shock of the step-variable transmission 20 upon initiation of the inertia phase is reduced. Thus, the control apparatus according to the present embodiment permits reduction of the risk of generation of the shifting shock in the process of the shift-up action while permitting reduction of the risk of reduction of durability of the one-way clutch OWC.

The present embodiment is further configured to temporarily keep the commanded value of the releasing hydraulic pressure Pb2 of the brake B2 at the predetermined hold-pressure value α larger than zero, to thereby delay the releasing action of the brake B2. Accordingly, the present embodiment permits not only the reduction of the risk of reduction of durability of the one-way clutch. OWC, but also a quick releasing action of the brake B2, making it possible to prevent the tie-up state of the step-variable transmission 20.

The present embodiment is also configured to change the predetermined hold-pressure value α according to the temperature THoil of the working fluid. Accordingly, the present embodiment permits not only the reduction of the risk of reduction of durability of the one-way clutch OWC irrespective of the temperature THoil of the working fluid, but also the quick releasing action of the brake B2 when the AT input torque Ti has been reduced to or below the predetermined value K. The present embodiment is also configured to change the predetermined hold-pressure value α according to the running speed V of the vehicle 10. Accordingly, the present embodiment permits not only the reduction of the risk of reduction of durability of the one-way clutch OWL irrespective of the vehicle running speed V, but also the quick releasing action of the brake B2 when the AT input torque Ti has been reduced to or below the predetermined value K.

The present embodiment is further configured such that the required torque determining portion 88 continuously determines whether the AT input torque Ti is larger than the predetermined value K, during the time period from the moment of initiation of the shift-up action of the step-variable transmission 20 to the moment of initiation of the inertia phase of the shift-up action. Accordingly, the present embodiment permits the quick releasing action of the brake B2 when the AT input torque Ti has been reduced to or below the predetermined value K during the shift-up action, making it possible to prevent the tie-up state of the step-variable transmission 20.

A second embodiment of this invention will be described. It is noted that the same reference signs as used in the first embodiment will be used to identify the elements of the second embodiment corresponding to those of the first embodiment, and that those elements will not be redundantly described.

Second Embodiment

Figure 12:
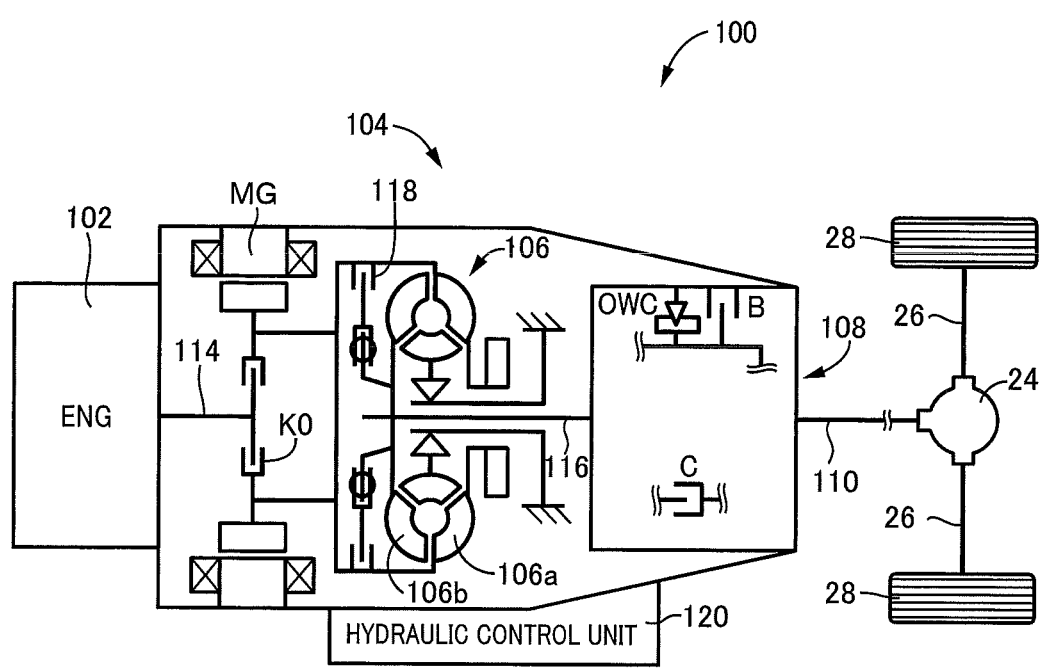
FIG. 12 is a schematic view showing an arrangement of a power transmitting path from an engine and a motor/generator to drive wheels of a vehicle to be controlled by the electronic control device according to a second embodiment of the present invention.

FIG. 12 is the schematic view showing an arrangement of a power transmitting path from an engine 102 and a motor/generator MG to drive wheels 28 of a vehicle 100 to be controlled by the electronic control device according to the second embodiment of the present invention. As shown in FIG. 12, the vehicle 100 has a drive system 104 including the engine 102, an engine connecting/disconnecting clutch K0, the motor/generator MG, a torque converter 106, and a step-variable transmission 108. The drive system 104 also includes: an output rotary member in the form of an output shaft 110 of the step-variable transmission 108; a differential gear mechanism (differential gear) 24 operatively connected to the output shaft 110 in a power transmittable manner via a propeller shaft (not shown); and a pair of axles 26 connected to the differential gear mechanism 24. The drive system 104 thus constructed is suitably used in the vehicle 100 of an FR type (front-engine rear-drive type), for instance. In the drive system 104, a drive force of the engine 102 is transmitted from an engine connecting shaft 114 connecting the engine 102 and the engine connecting/disconnecting clutch K0, to the pair of drive wheels 28 via the engine connecting/disconnecting clutch K0, the torque converter 106, the step-variable transmission 108, the output shaft 110, the differential gear mechanism 24 and the pair of axles 26 in this order of description, while the engine connecting/disconnecting clutch K0 is placed in its engaged state.

The torque converter 106 is a fluid-operated type power transmitting device constructed to transmit a drive force from its pump impeller 106a toward the step-variable transmission 108 via a working fluid. The pump impeller 106a is an input rotary element of the torque converter 106, which is connected to the engine 102 through the engine connecting/disconnecting clutch K0 and the engine connecting shaft 114 in this order of description, and which receives the drive force from the engine 102 and is rotatable about its axis. The torque converter 106 further has an output rotary element in the form of a turbine impeller 106b which is connected to an input rotary element of the step-variable transmission 108 in the form of a transmission input shaft 116, through spline coupling with the transmission input shaft 116, for example, such that the turbine impeller 106b is rotated together with the transmission input shaft 116. The torque converter 106 further has a lock-up clutch 118, which is a direct-coupling clutch disposed between the pump impeller 106a and the turbine impeller 106b. The lock-up clutch 118 is hydraulically controlled so as to be selectively placed in its fully engaged state, partially slipping state and fully released state.

The motor/generator MG has a function of an electric motor operable to convert an electric energy into a mechanical drive force, and a function of an electric generator operable to convert a mechanical energy into an electric energy. In other words, the motor/generator MG not only functions as a vehicle drive power source operating in place of or in addition to the engine 102 provided as a drive power source, but also functions as an electricity generating device a regenerative control of which is implemented to convert a reverse driving torque transmitted from the drive wheels 28, into an electric energy.

For example, the engine connecting/disconnecting clutch K0 is a hydraulically operated frictional coupling device of a wet multiple-disc type wherein a plurality of friction plates superposed on each other are pressed against each other by a hydraulic actuator. The engine connecting/disconnecting clutch K0 is selectively placed in its engaged or released state, under the control of a hydraulic control unit 120 which is provided with a linear solenoid valve, for example, for regulating a hydraulic pressure applied to the hydraulic actuator so as to continuously change a torque capacity of the engine connecting/disconnecting clutch K0, namely, a drive torque that can be transmitted through the clutch K0, that is, a force of pressing of the friction plates against each other.

The step-variable transmission 108 is operatively connected to the motor/generator MG in a power transmittable manner, without via the engine connecting/disconnecting clutch K0, and constitutes a part of the power transmitting path from the engine 102 and the motor/generator MG to the drive wheels 28. Thus, the step-variable transmission 108 transmits a drive force from the vehicle drive power source (engine 102 and motor/generator MG) to the drive wheels 28. For instance, the step-variable transmission 108 is a multiple-step shifting device of a planetary gear type functioning as an automatic step-variable transmission which is selectively placed in one of a plurality of AT gear positions with selective engaging and releasing actions of a plurality of hydraulically operated frictional coupling devices such as clutches C and brakes B, and a one-way clutch OWC.

In the step-variable transmission 108, a predetermined AT gear position (first speed AT gear position, for example) is established when the one-way clutch OWC and a brake B disposed parallel with the one-way clutch OWC are placed in their engaged states. When the step-variable transmission 108 is shifted up from the predetermined AT gear position to another, there are a risk of reduction of durability of the one-way clutch OWC and a risk of generation of a shifting shock of the step-variable transmission 108 upon initiation of an inertia phase of the shift-up action, as described above with respect to the preceding first embodiment. In view of these risks, the risks of reduction of the durability of the one-way clutch OWC and generation of the shifting shock can be reduced by controlling a releasing hydraulic pressure Pb of the brake B, depending upon whether the input torque Ti of the step-variable transmission 108 is larger than a predetermined upper limit K, as in the first embodiment. Accordingly, the present second embodiment has substantially the same advantages as the first embodiment.

While the preferred embodiments of this invention have been described in detail by reference to the drawings, it is to be understood that the invention may be otherwise embodied.

In the illustrated embodiments, the vehicle 10, 100 is a hybrid vehicle provided with the engine 14, 102. However, the control apparatus according to the present invention is equally applicable to a vehicle not provided with an engine. Described more specifically, the control apparatus according to the invention is applicable to an electric vehicle provided with only a motor/generator as a drive power source. That is, the present invention is applicable to a vehicle provided with a step-variable transmission having a one-way clutch OWC and a coupling device disposed parallel with the one-way clutch. OWC, irrespective of the type of the drive power source.

In the illustrated first embodiment, the brake B2 is disposed parallel with the one-way clutch OWC. However, any other coupling device such as the brake B1 may be disposed parallel with the one-way clutch OWC.

In the vehicle 10 according to the illustrated first embodiment, the brake B2 is placed in the engaged state even during a normal running of the vehicle 10 with a forward drive torque. However, the brake B2 may be placed in the engaged state when it is predicted that the drive torque of the vehicle 10 is switched from a forward drive torque to a reverse drive torque. It is noted that the switching of the drive torque to the reverse drive torque is predicted depending upon a decrease of the accelerator pedal operation amount θacc, for example.

In the illustrated first embodiment, the predetermined commanded value α of the releasing hydraulic pressure Pb2 is set on the basis of the input torque Ti, the working fluid temperature THoil, and the vehicle running speed V. However, the commanded value α may be set on the basis of at least one of those parameters. Further, the input torque Ti used to set the commanded value α may be replaced by a value relating to the input torque Ti, such as the accelerator pedal operation amount θacc. Similarly, the vehicle running speed V used to set the commanded value α may be replaced by a value relating to the vehicle running speed V, such as the output shaft speed ωo.

It is to be understood that the embodiments and modifications described above are given for illustrative purpose only, and that the present invention may be embodied with various other changes and improvements which may occur to those skilled in the art.

NOMENCLATURE OF ELEMENTS 10, 100: Vehicle
14, 102: Engine (Drive power source)
20, 108: Step-variable transmission
28: Drive wheels
30: Intermediate power transmitting member (Input shaft)
32: Differential mechanism
80: Electronic control device (Control apparatus)
82: Transmission shifting control portion (Control portion)
88: Required torque determining portion (Control portion)
90: Held-pressure setting portion (Control portion)
RE1: First rotary element
RE2: Second rotary element
RE3: Third rotary element
B2, B: Second brake (Coupling device)
OWC: One-way clutch
MG: Motor/generator
MG1: First motor/generator
MG2: Second motor/generator
α: Predetermined hold-pressure value
THoil: Working fluid temperature
V: Vehicle running speed

What is claimed is:

1. A control apparatus for a vehicle provided with a step-variable transmission which is disposed between a drive power source and drive wheels and which includes a one-way clutch to be placed in its engaged state to establish a predetermined one of gear positions of the step-variable transmission, and a coupling device disposed parallel with the one-way clutch, the control apparatus comprising:

a control portion configured to control a shift-up action of the step-variable transmission from said predetermined one gear position in which the coupling device is placed in an engaged state, the control portion controlling the shift-up action so as to delay a releasing action of the coupling device where a required torque of the vehicle prior to a moment of initiation of an inertia phase of the shift-up action is larger than a predetermined value, with respect to the releasing action where the required torque is not larger than the predetermined value.

2. The control apparatus according to claim 1, wherein the control portion temporarily keeps a commanded value of a releasing hydraulic pressure of the coupling device at a predetermined hold-pressure value, to thereby delay the releasing action of the coupling device.

3. The control apparatus according to claim 2, wherein the control portion changes the predetermined hold-pressure value according to a temperature of a working fluid used to operate the coupling device.

4. The control apparatus according to claim 2, wherein the control portion changes the predetermined hold-pressure value according to a running speed of the vehicle.

5. The control apparatus according to claim 1, wherein the control portion is configured to continuously determine whether the required torque of the vehicle is larger than the predetermined value, during a time period from a moment of initiation of the shift-up action of the step-variable transmission to the moment of initiation of the inertia phase of the shift-up action.

6. The control apparatus according to claim 1, wherein the drive power source includes: an engine; a differential mechanism having a first rotary element operatively connected to the engine in a power transmittable manner, a second rotary element to which a first motor/generator is operatively connected in a power transmittable manner, and a third rotary element to which an input shaft of the step-variable transmission is connected; and a second motor/generator operatively connected to the third rotary element of the differential mechanism in a power transmittable manner.

* * * * *